United States Patent
Lan et al.

(10) Patent No.: US 12,250,142 B2
(45) Date of Patent: Mar. 11, 2025

(54) ROUTING INFORMATION SENDING METHOD, PACKET SENDING METHOD, AND RELATED APPARATUS

(71) Applicant: Huawei Technologies Co., Ltd., Shenzhen (CN)

(72) Inventors: Ruqin Lan, Beijing (CN); Guoqi Xu, Beijing (CN); Chuang Chen, Beijing (CN); Guoquan Liu, Beijing (CN); Zuliang Wang, Beijing (CN)

(73) Assignee: HUAWEI TECHONLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/355,951

(22) Filed: Jun. 23, 2021

(65) Prior Publication Data
US 2021/0409310 A1    Dec. 30, 2021

(30) Foreign Application Priority Data

Jun. 24, 2020   (CN) .......................... 202010592661.3

(51) Int. Cl.
*H04L 45/02*    (2022.01)
*H04L 45/00*    (2022.01)
(Continued)

(52) U.S. Cl.
CPC ............ *H04L 45/245* (2013.01); *H04L 45/02* (2013.01); *H04L 45/44* (2013.01); *H04L 45/566* (2013.01)

(58) Field of Classification Search
CPC ....... H04L 45/245; H04L 45/02; H04L 45/44; H04L 45/566; H04L 45/03; H04L 45/04; H04L 45/021; H04L 45/32
See application file for complete search history.

(56) References Cited

U.S. PATENT DOCUMENTS

| 10,601,724 B1 | 3/2020 | Filsfils et al. |
| 10,637,768 B1 | 4/2020 | Joseph et al. |

(Continued)

FOREIGN PATENT DOCUMENTS

| CN | 1655556 A | 8/2005 |
| CN | 101014014 A | 8/2007 |

(Continued)

OTHER PUBLICATIONS

Y. Rekhter, Ed., "A Border Gateway Protocol 4 (BGP-4)", 2006 (Year: 2006).*

(Continued)

*Primary Examiner* — Messeret F Gebre
(74) *Attorney, Agent, or Firm* — Conley Rose, P.C.

(57) ABSTRACT

A method is applied to a network comprising a first area and a second area. A first node in the first area obtains aggregated routing information, where the aggregated routing information is obtained by aggregating a plurality of pieces of original routing information, the plurality of pieces of original routing information correspond to N nodes in a network segment, the N nodes in the network segment have a same flexible algorithm flex-algo, and the aggregated routing information carries an algorithm identifier used to indicate the flex-algo and a network segment identifier used to indicate the network segment. The first node sends the aggregated routing information to the second area, where the aggregated routing information is used to indicate a node in the second area to send a packet to the N nodes in the network segment based on the aggregated routing information.

38 Claims, 8 Drawing Sheets

(51) Int. Cl.
  *H04L 45/24* (2022.01)
  *H04L 45/44* (2022.01)

(56) References Cited

U.S. PATENT DOCUMENTS

| | | | |
|---|---|---|---|
| 2006/0262735 A1 | 11/2006 | Guichard et al. | |
| 2006/0268681 A1* | 11/2006 | Raza | H04L 45/02 370/216 |
| 2008/0101418 A1* | 5/2008 | Vasseur | H04L 12/66 370/503 |
| 2009/0103538 A1 | 4/2009 | Yoshimi | |
| 2012/0166658 A1* | 6/2012 | Kim | H04L 45/04 709/228 |
| 2013/0021943 A1 | 1/2013 | Lu et al. | |
| 2013/0272306 A1 | 10/2013 | Niu et al. | |
| 2020/0145319 A1 | 5/2020 | Joseph et al. | |
| 2020/0244588 A1* | 7/2020 | Filsfils | H04L 47/10 |
| 2021/0083940 A1 | 3/2021 | Peng et al. | |
| 2021/0119917 A1 | 4/2021 | Yu | |
| 2021/0250273 A1* | 8/2021 | Kaplan | H04L 45/02 |
| 2021/0258249 A1* | 8/2021 | Torvi | H04L 45/34 |
| 2022/0014394 A1 | 1/2022 | Zhao et al. | |
| 2022/0052945 A1 | 2/2022 | Peng et al. | |

FOREIGN PATENT DOCUMENTS

| | | |
|---|---|---|
| CN | 103001872 A | 3/2013 |
| CN | 103338252 A | 10/2013 |
| CN | 104320336 A | 1/2015 |
| CN | 109831382 A | 5/2019 |
| CN | 110636008 A | 12/2019 |
| CN | 110661711 A | 1/2020 |
| CN | 110912795 A | 3/2020 |
| CN | 110932895 A | 3/2020 |
| CN | 110944357 A | 3/2020 |
| CN | 111147373 A | 5/2020 |
| JP | 2009105534 A | 5/2009 |
| JP | 2014523720 A | 9/2014 |
| WO | 2020107977 A1 | 6/2020 |

OTHER PUBLICATIONS

"BGP route aggregation: Suppress MAP and Attribute MAP", 2017 (Year: 2017).*
"A Border Gateway Protocol 4 (BGP-4)", 2006 (Year: 2006).*
"Flexible Algorithm Definition advertisement with BGP Link-State" draft-ietf-idr-bgp-ls-flex-algo-02", Jan. 2020 (Year: 2020).*
Filsfils "SR IGP Flex Algo" (Year: 2018).*
Talaulikar, "Flexible Algorithm Definition Advertisement with BGP Link-State draft-ietf-idr-bgp-ls-flex-algo-02", Jan. 2020. (Year: 2020).*
B. S. Mathapati, S. R. Patil and V. D. Mytri, "Energy Efficient Reliable Data Aggregation Technique for Wireless Sensor Networks," 2012 International Conference on Computing Sciences, Phagwara, India, 2012, pp. 153-158 (Year: 2012).*
Gong, J., Qiu, X., Wang, S., & Huang, X. (2018). Information aggregation via dynamic routing for sequence encoding [arXiv]. ArXiv, 11 pp. (Year: 2018).*
F. Bohdanowicz and C. Henke, "Loop detection and automated route aggregation in distance vector routing," 2014 IEEE Symposium on Computers and Communications (ISCC), Funchal, Portugal, 2014, pp. 1-6 (Year: 2014).*
Zhu, Y., et al., "Using Flex-Algo for Segment Routing based VTN," draft-zhu-lsr-isis-sr-vtn-flexalgo-00, Mar. 9, 2020, 7 pages.
Psenak, P., Ed., "IGP Flexible Algorithm," draft-ietf-lsr-flex-algo-03.txt, Jul. 4, 2019, 31 pages.
Psenak, P., Ed., et al., "IGP Flexible Al.gorithm," draft-ietf-lsr-flex-algo-00.txt, May 15, 2018, 23 pages.
Talaulikar, K., et al., "Flexible Algorithm Definition Advertisement with BGP Link-State," draft-ketant-idr-bgp-ls-flex-algo-00, Jul. 1, 2018, 10 pages.
Peng, S., et al., "Packet Network Slicing using Segment Routing, " draft-peng-teas-network-slicing-02, Dec. 17, 2019, 24 pages.
S. Matsushima, et al., "Segment Routing IPv6 for Mobile User Plane," draft-ietf-dmm-srv6-mobile-uplane-0, Mar. 5, 2018, 27 pages.
Zhou Ming, et al., "Link State Detection Protocol Based on ICMP Extension," Computer Systems and Applications, 2017, 5 pages.
Ye FaDa et al., "Research on a Routing Algorithm Supporting Node Mobility in Hierarchical Ad Hoc Networks," Nov. 2015, 79 pages.
Psenak, P., Ed., et al., "IGP Flexible Algorithm," draft-ietf-lsr-flex-algo-07.txt, Network Working Group, Apr. 1, 2020, 28 pages.

* cited by examiner

ROUTING INFORMATION SENDING METHOD, PACKET SENDING METHOD, AND RELATED APPARATUS

CROSS-REFERENCE TO RELATED APPLICATIONS

This claims priority to Chinese Patent App. No. 202010592661.3, filed on Jun. 24, 2020, which is incorporated by reference.

FIELD

This disclosure relates to the field of communications technologies, and in particular, to a routing information sending method, a packet sending method, and a related apparatus.

BACKGROUND

Routing flooding refers to a routing node (briefly referred to as a node) sending routing information of the routing node to a neighboring node. For example, the routing information includes a link state packet (LSP) to implement link state database (LSDB) synchronization. The neighboring node transmits the routing information to another neighboring node other than the node sending the routing information, so that the routing information is transmitted to all nodes level by level. In this "flooding" manner, all nodes can have the routing information, so that LSDB synchronization can be maintained. A data packet can be transmitted between nodes that maintain LSDB synchronization.

The International Organization for Standardization (ISO) proposed Intermediate System to Intermediate System (IS-IS), in which one domain is divided into a plurality of areas. Nodes in different areas in the plurality of areas also need routing "flooding" before transmitting a data packet. That an area 1 "floods" an area 2 is used as an example. A specific implementation is as follows: Each node in the area 1 sends routing information to the area 2. If there are a large quantity of nodes in the area 1, the area 1 needs to send a large amount of routing information to the area 2. As a result, a long time is consumed and the flooding efficiency is relatively low.

SUMMARY

An objective of this disclosure is to provide a routing information sending method, a packet sending method, and a related apparatus, to improve the routing information sending (flooding) efficiency.

According to a first aspect, a routing information sending method is applied to a network, the network includes a first area and a second area, and the method includes: A first node in the first area obtains aggregated routing information, where the aggregated routing information is obtained by aggregating a plurality of pieces of original routing information, the plurality of pieces of original routing information correspond to N nodes in a network segment, the network segment is included in the first area, the N nodes in the network segment have a same flexible algorithm flex-algo, the aggregated routing information carries an algorithm identifier used to indicate the flex-algo and a network segment identifier used to indicate the network segment, and N is a positive integer. The first node sends the aggregated routing information to the second area, where the aggregated routing information is used to indicate a node in the second area to send a packet to the N nodes in the network segment based on the aggregated routing information.

Therefore, in this embodiment, when flooding the second area, the first area may send the aggregated routing information to the second area, to reduce an amount of routing information that needs to be sent, and improve the routing "flooding" efficiency. In addition, the aggregated routing information carries the network segment identifier and the algorithm identifier. In this way, the node in the second area can determine the network segment in the first area and the algorithm of the node in the network segment by using the aggregated routing information, so that the node in the second area sends the packet to the node in the network segment in the first area.

In a possible design, each of the plurality of pieces of original routing information includes the algorithm identifier and a subnet identifier, the subnet identifier is used to indicate a subnet in which a node corresponding to the original routing information is located, and the subnet is included in the network segment.

The original routing information includes the algorithm identifier and the subnet identifier. The algorithm identifier in the original routing information is used to determine the algorithm used by the node corresponding to the original routing information, the subnet identifier in the original routing information is used to determine the subnet in which the node corresponding to the original routing information is located, and the subnet may be used to determine the network segment in which the node is located. Therefore, the first node aggregates the plurality of pieces of original routing information that have the same algorithm identifier and belong to the same network segment, to obtain the aggregated routing information. In this way, when flooding the second area, the first area may send the aggregated routing information to the second area, and does not need to send the plurality of pieces of original routing information aggregated in the aggregated routing information, to reduce an amount of routing information that needs to be sent, and improve the routing "flooding" efficiency.

In a possible design, the network segment identifier carried in the aggregated routing information is determined based on the subnet identifiers in the plurality of pieces of original routing information.

The original routing information includes the algorithm identifier and the subnet identifier. The subnet identifier is used to determine the subnet in which the node corresponding to the original routing information is located, and the subnet may be used to determine the network segment in which the node is located. Therefore, the first node aggregates the plurality of pieces of original routing information that have the same algorithm identifier and belong to the same network segment, to obtain the aggregated routing information. In this way, when flooding the second area, the first area may send the aggregated routing information to the second area, and does not need to send the plurality of pieces of original routing information aggregated in the aggregated routing information, to reduce an amount of routing information that needs to be sent, and improve the routing "flooding" efficiency.

In a possible design, when a subnet identifier in first original routing information in the plurality of pieces of original routing information changes, and an algorithm identifier included in the first original routing information remains unchanged, both the network segment identifier and the algorithm identifier in the aggregated routing information remain unchanged.

In this embodiment, after the first area sends the aggregated routing information to the second area, if route flapping occurs in the first area, the first area does not need to re-flood the second area. That the route flapping occurs in the first area includes that original routing information of a node in the first area changes. For example, a subnet identifier in one of the plurality of pieces of original routing information aggregated in the aggregated routing information changes but an algorithm identifier remains unchanged. In this case, the aggregated routing information remains unchanged, in other words, the network segment identifier and the algorithm identifier in the aggregated routing information remain unchanged. Therefore, the first area does not need to re-send the aggregated routing information to the second area, to reduce power consumption.

In a possible design, the method further includes: aggregating original routing information of a third node in the aggregated routing information, where the third node is a new node added in the network segment, and the third node has the flex-algo.

In this embodiment, after the first area sends the aggregated routing information to the second area, when a new node is added in the first area, the first node may aggregate original routing information of the newly added node in the aggregated routing information. Therefore, when a new node is added in the first area, the first area does not need to re-flood the second area, and does not need to send original routing information of the newly added node to the second area either, to reduce power consumption.

In a possible design, that the first node aggregates the original routing information of the third node in the aggregated routing information includes: The first node adds the original routing information of the third node to an original routing information set corresponding to the aggregated routing information, where the original routing information set includes all original routing information aggregated in the aggregated routing information.

The first node may store the aggregated routing information and the original routing information set corresponding to the aggregated routing information. Therefore, when aggregating the original routing information of the newly added node in the aggregated routing information, the first node may add the original routing information of the newly added node to the original routing information set. Therefore, when a new node is added in the first area, the aggregated routing information is not affected, and the first area does not need to re-flood the second area, and does not need to send original routing information of the newly added node to the second area either, to reduce power consumption.

In a possible design, the first node is an area connection node in the first area and the second area, or the first node is another node in the first area other than an area connection node, where the area connection node is located in both the first area and the second area.

The first node may be any node in the first area, for example, the area connection node or another node other than the area connection node. This is not limited in this embodiment.

In a possible design, when the first node is the area connection node, that the first node sends the aggregated routing information to the second area includes: The first node sends the aggregated routing information to another node in the second area other than the area connection node.

The first node may be the area connection node in the first area. Because the area connection node is located in both the first area and the second area, the first node may send the aggregated routing information to another node in the second area other than the area connection node, to implement routing flooding from the first area to the second area. Because an amount of routing information that needs to be sent by the first area is relatively small, the routing "flooding" efficiency is relatively high.

In a possible design, when the first node is another node in the first area other than the area connection node, that the first node sends the aggregated routing information to the second area includes: The first node sends the aggregated routing information to the area connection node, so that the aggregated routing information is sent to another node in the second area other than the area connection node by using the area connection node.

The first node may be another node in the first area other than the area connection node. In this case, the first node may send the aggregated routing information to the second area by using the area connection node, to implement routing flooding from the first area to the second area. Because an amount of routing information that needs to be sent by the first area is relatively small, the routing "flooding" efficiency is relatively high.

According to a second aspect, a packet sending method is applied to a network, the network includes a first area and a second area, and the method includes: A first node in the second area obtains aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer. The first node sends a packet to the N nodes in the network segment based on the aggregated routing information.

Therefore, in this embodiment, when flooding the second area, the first area may send the aggregated routing information to the second area, in other words, an amount of routing information that needs to be sent is reduced, to improve the routing "flooding" efficiency. In addition, the aggregated routing information carries the network segment identifier and the algorithm identifier. In this way, the node in the second area can determine the network segment in the first area and the algorithm of the node in the network segment by using the aggregated routing information, so that the node in the second area sends the packet to the node in the network segment in the first area.

In a possible design, each of the plurality of pieces of original routing information includes the algorithm identifier and a subnet identifier, the subnet identifier is used to indicate a subnet in which a node corresponding to the original routing information is located, and the subnet is included in the network segment.

The original routing information includes the algorithm identifier and the subnet identifier. The algorithm identifier in the original routing information is used to determine the algorithm used by the node corresponding to the original routing information, the subnet identifier in the original routing information is used to determine the subnet in which the node corresponding to the original routing information is located, and the subnet may be used to determine the network segment in which the node is located. Therefore, the first node aggregates the plurality of pieces of original routing information that have the same algorithm identifier and belong to the same network segment, to obtain the aggregated routing information. In this way, when flooding the second area, the first area may send the aggregated routing information to the second area, and does not need to send the plurality of pieces of original routing information aggregated in the aggregated routing information, to reduce an amount of routing information that needs to be sent, and improve the routing "flooding" efficiency.

In a possible design, the network segment identifier carried in the aggregated routing information is determined based on the subnet identifiers in the plurality of pieces of original routing information.

The original routing information includes the algorithm identifier and the subnet identifier. The subnet identifier is used to determine the subnet in which the node corresponding to the original routing information is located, and the subnet may be used to determine the network segment in which the node is located. Therefore, the first node aggregates the plurality of pieces of original routing information that have the same algorithm identifier and belong to the same network segment, to obtain the aggregated routing information. In this way, when flooding the second area, the first area may send the aggregated routing information to the second area, and does not need to send the plurality of pieces of original routing information aggregated in the aggregated routing information, to reduce an amount of routing information that needs to be sent, and improve the routing "flooding" efficiency.

In a possible design, the first node is an area connection node in the first area and the second area, or the first node is another node in the second area other than an area connection node, where the area connection node is located in both the first area and the second area.

The first node may be any node in the second area, for example, the area connection node or another node other than the area connection node. This is not limited in this embodiment.

In a possible design, when the first node is another node in the second area other than the area connection node, that the first node obtains the aggregated routing information includes: The first node obtains the aggregated routing information from the area connection node, where the area connection node stores the aggregated routing information and all original routing information aggregated in the aggregated routing information.

The first node may be another node in the second area other than the area connection node. Because the area connection node is located in both the first area and the second area, the first node may receive the aggregated routing information from the area connection node, to implement routing flooding from the first area to the second area. Because an amount of routing information that needs to be sent by the first area is relatively small, the routing "flooding" efficiency is relatively high.

In a possible design, the method further includes: The first node obtains a packet, where the packet matches the aggregated routing information, and a destination node of the packet is a node in the network segment. The first node sends the packet to the area connection node based on the aggregated routing information, so that the area connection node sends the packet to the destination node.

Therefore, in the packet sending method provided in this embodiment, before sending the packet to the first area, the second area does not need to obtain a large amount of original routing information in the first area, but only needs to obtain the aggregated routing information obtained by aggregating the plurality of pieces of original routing information, to improve the routing flooding efficiency. In addition, the aggregated routing information carries the network segment identifier and the algorithm identifier. In this way, the node in the second area can determine the network segment in the first area and the algorithm of the node in the network segment by using the aggregated routing information, so that the node in the second area sends the packet to the node in the network segment in the first area.

According to a third aspect, a routing node is a node in a network, the network includes a first area and a second area, the node is included in the first area, and the node includes: a processing unit configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer; and a transceiver unit configured to send a packet to the N nodes in the network segment based on the aggregated routing information.

In a possible design, each of the plurality of pieces of original routing information includes the algorithm identifier and a subnet identifier, the subnet identifier is used to indicate a subnet in which a node corresponding to the original routing information is located, and the subnet is included in the network segment.

In a possible design, the network segment identifier carried in the aggregated routing information is determined based on the subnet identifiers in the plurality of pieces of original routing information.

In a possible design, when a subnet identifier in first original routing information in the plurality of pieces of original routing information changes, and an algorithm identifier included in the first original routing information remains unchanged, both the network segment identifier and the algorithm identifier in the aggregated routing information remain unchanged.

In a possible design, the processing unit is further configured to aggregate original routing information of a third node in the aggregated routing information, where the third node is a new node added in the network segment, and the third node has the flex-algo.

In a possible design, the processing unit is further configured to add the original routing information of the third node to an original routing information set corresponding to the aggregated routing information, where the original routing information set includes all original routing information aggregated in the aggregated routing information.

In a possible design, the node is an area connection node in the first area and the second area, or the node is another node in the first area other than an area connection node, where the area connection node is located in both the first area and the second area.

In a possible design, when the node is the area connection node, when being configured to send the aggregated routing information to the second area, the transceiver unit is further configured to send the aggregated routing information to another node in the second area other than the area connection node.

In a possible design, when the node is another node in the first area other than the area connection node, when being configured to send the aggregated routing information to the second area, the transceiver unit is further configured to send the aggregated routing information to the area connection node, so that the aggregated routing information is sent to another node in the second area other than the area connection node by using the area connection node.

According to a fourth aspect, a routing node is a node in a network, the network includes a first area and a second area, the node is located in the second area, and the node includes: a processing unit configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer; and a transceiver unit configured to send a packet to the N nodes in the network segment based on the aggregated routing information.

In a possible design, each of the plurality of pieces of original routing information includes the algorithm identifier and a subnet identifier, the subnet identifier is used to indicate a subnet in which a node corresponding to the original routing information is located, and the subnet is included in the network segment.

In a possible design, the network segment identifier carried in the aggregated routing information is determined based on the subnet identifiers in the plurality of pieces of original routing information.

In a possible design, the node is an area connection node in the first area and the second area, or the node is another node in the second area other than an area connection node, where the area connection node is located in both the first area and the second area.

In a possible design, when the node is another node in the second area other than the area connection node, the processing unit is further configured to obtain the aggregated routing information from the area connection node, where the area connection node stores the aggregated routing information and all original routing information aggregated in the aggregated routing information.

In a possible design, the processing unit is further configured to obtain a packet, where the packet matches the aggregated routing information, and a destination node of the packet is a node in the network segment; and the transceiver unit is further configured to send the packet to the area connection node based on the aggregated routing information, so that the area connection node sends the packet to the destination node.

According to a fifth aspect, a routing node is further provided. The node is a node in a network, the network includes a first area and a second area, the node is included in the first area, and the node includes: a processor configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer; and a transceiver configured to send the aggregated routing information to the second area, where the aggregated routing information is used to indicate a node in the second area to send a packet to the N nodes in the network segment based on the aggregated routing information.

In a possible design, each of the plurality of pieces of original routing information includes the algorithm identifier and a subnet identifier, the subnet identifier is used to indicate a subnet in which a node corresponding to the original routing information is located, and the subnet is included in the network segment.

In a possible design, the network segment identifier carried in the aggregated routing information is determined based on the subnet identifiers in the plurality of pieces of original routing information.

In a possible design, when a subnet identifier in first original routing information in the plurality of pieces of original routing information changes, and an algorithm identifier included in the first original routing information remains unchanged, both the network segment identifier and the algorithm identifier in the aggregated routing information remain unchanged.

In a possible design, the processor is further configured to aggregate original routing information of a third node in the aggregated routing information, where the third node is a new node added in the network segment, and the third node has the flex-algo.

In a possible design, the processor is further configured to add the original routing information of the third node to an original routing information set corresponding to the aggregated routing information, where the original routing information set includes all original routing information aggregated in the aggregated routing information.

In a possible design, the node is an area connection node in the first area and the second area, or the node is another node in the first area other than an area connection node, where the area connection node is located in both the first area and the second area.

In a possible design, when the node is the area connection node, when being configured to send the aggregated routing information to the second area, the transceiver is further configured to send the aggregated routing information to another node in the second area other than the area connection node.

In a possible design, when the node is another node in the first area other than the area connection node, when being configured to send the aggregated routing information to the second area, the transceiver is further configured to send the aggregated routing information to the area connection node, so that the aggregated routing information is sent to another node in the second area other than the area connection node by using the area connection node.

According to a sixth aspect, a routing node is further provided. The node is a node in a network, the network includes a first area and a second area, the node is included in the second area, and the node includes: a processor configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer; and a transceiver configured to send a packet to the N nodes in the network segment based on the aggregated routing information.

In a possible design, each of the plurality of pieces of original routing information includes the algorithm identifier and a subnet identifier, the subnet identifier is used to indicate a subnet in which a node corresponding to the original routing information is located, and the subnet is included in the network segment.

In a possible design, the network segment identifier carried in the aggregated routing information is determined based on the subnet identifiers in the plurality of pieces of original routing information.

In a possible design, the node is an area connection node in the first area and the second area, or the node is another node in the second area other than an area connection node, where the area connection node is located in both the first area and the second area.

In a possible design, when the node is another node in the second area other than the area connection node, the processor is further configured to obtain the aggregated routing information from the area connection node, where the area connection node stores the aggregated routing information and all original routing information aggregated in the aggregated routing information.

In a possible design, the processor is further configured to obtain a packet, where the packet matches the aggregated routing information, and a destination node of the packet is a node in the network segment; and the transceiver is further configured to send the packet to the area connection node based on the aggregated routing information, so that the area connection node sends the packet to the destination node.

According to a seventh aspect, a routing system includes a first node configured to implement the method provided in the first aspect; and a second node configured to implement the method provided in the second aspect.

The first node and the second node are nodes in a network, the network includes a first area and a second area, the first node is included in the first area, and the second node is included in the second area.

According to an eighth aspect, a routing network includes a first area and a second area.

A first node in the first area is configured to implement the method provided in the first aspect.

A second node in the second area is configured to implement the method provided in the second aspect.

According to a ninth aspect, a computer readable storage medium includes computer instructions. When the computer instructions are run on a computer, the computer is enabled to perform the method provided in the first aspect.

According to a tenth aspect, a computer readable storage medium includes computer instructions. When the computer instructions are run on a computer, the computer is enabled to perform the method provided in the second aspect.

According to an eleventh aspect, a computer program product including instructions is further provided. When the computer program product is run on a computer, the computer is enabled to perform the method provided in the first aspect.

According to a twelfth aspect, a computer program product including instructions is further provided. When the computer program product is run on a computer, the computer is enabled to perform the method provided in the second aspect.

According to a thirteenth aspect, a chip is further provided. The chip includes a processor and a data interface, and the processor reads, by using the data interface, instructions stored in a memory, to perform the method provided in the first aspect.

In a possible design, the chip may further include the memory, the memory stores the instructions, the processor is configured to execute the instructions stored in the memory, and when the instructions are executed, the processor is configured to perform the method in the first aspect.

According to a fourteenth aspect, a chip is further provided. The chip includes a processor and a data interface, and the processor reads, by using the data interface, instructions stored in a memory, to perform the method provided in the second aspect.

In a possible design, the chip may further include the memory, the memory stores the instructions, the processor is configured to execute the instructions stored in the memory, and when the instructions are executed, the processor is configured to perform the method in the second aspect.

For beneficial effects of the third aspect to the fourteenth aspect, refer to descriptions of beneficial effects of the first aspect and the second aspect. Details are not described herein again.

DETAILED DESCRIPTION

Figure 1A:
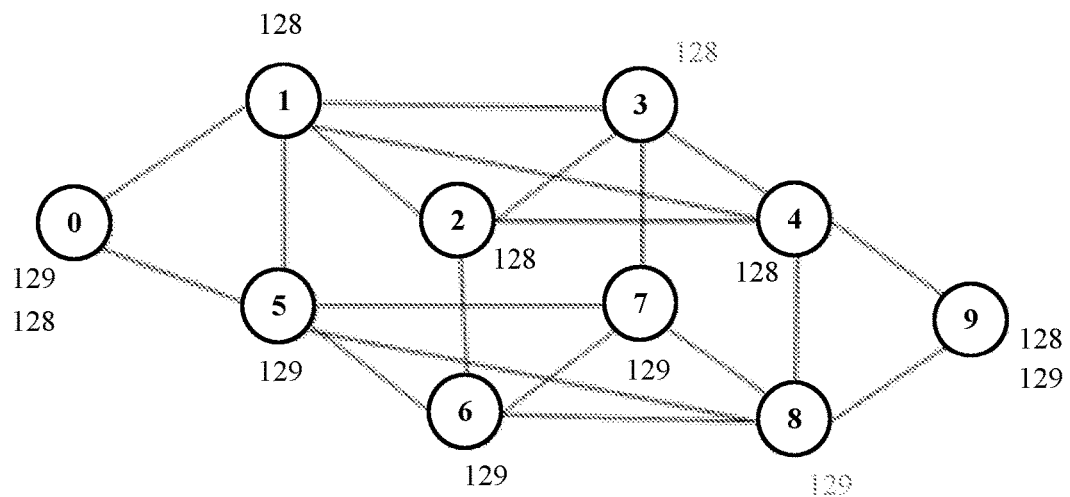
FIG. 1A is a schematic diagram of a plurality of nodes according to an embodiment.

The following first explains related terms in this disclosure.

(1) A routing node is a network device having functions such as generation, sending (or forwarding), receiving, and path selection of routing information. For example, the routing node may be a router or another routing module, and may be an independent device, an apparatus module in a device, a set of a plurality of apparatus modules in a device, a set of a plurality of devices, or the like. This is not limited in the embodiments.

For ease of description, a routing node is briefly referred to as a node in the following specification.

(2) For routing information, routing information includes original routing information and aggregated routing information. The original routing information corresponds to routing information with which a node performs flooding in the background, and may be alternatively referred to as "to-be-aggregated routing information", "to-be-processed routing information", "node routing information", or the like. This name is not limited in the embodiments.

The aggregated routing information is obtained by aggregating a plurality of pieces of original routing information, the plurality of pieces of original routing information may correspond to N nodes, and N is a positive integer. In other words, the original routing information and the node may be in a one-to-one correspondence or may be in a many-to-one correspondence. Description is provided below mainly by using an example in which the original routing information and the node are in a one-to-one correspondence.

(3) Routing flooding refers to a node sending original routing information of the node to a neighboring node, and the original routing information is, for example, an LSP. The neighboring node then transmits the original routing information to another neighboring node other than the node sending the original routing information, so that the original routing information is transmitted to all nodes level by level. In this "flooding" manner, all nodes can have the original routing information, and an LSDB synchronization can be maintained. A data packet can be transmitted between a plurality of routing nodes that maintain LSDB synchronization.

(4) A packet includes a protocol packet and a data packet. The protocol packet may be understood as a packet including various routing protocols (for example, an ISIS routing protocol), for example, a hello packet used to establish and maintain a neighbor relationship or a sequence number packet (SNP) packet. Different from the protocol packet, the data packet is a packet including information to be sent. The "information" in the packet including the "information" may be a service data packet generated in a process of executing, by a terminal device, a service. That "the terminal device executes the service" may include that the terminal device runs various applications. For example, in a scenario in which the terminal device runs a WeChat application to make a voice call to a contact, the "information" may be a voice data packet, and the data packet is a packet including the voice data packet. For another example, in a scenario in which the terminal device runs a short message service application, and a user edits content of a short message service message and sends the content of the short message service message to a contact, the "information" may be text information or the like, and the data packet is a packet including the text information.

(5) Area division is a manner in which a plurality of nodes are divided into different areas to isolate the nodes. In other words, two areas are isolated from each other. "Isolation" herein may be understood as that LSDBs of nodes in two areas are independent of each other and are not synchronized. Specifically, a first area and a second area are used as an example. LSDBs of nodes in the first area are synchronized, and therefore, a protocol packet can be transmitted between different nodes in the first area. Similarly, LSDBs of nodes in the second area are synchronized, and therefore, a protocol packet can be transmitted between the nodes. However, LSDBs of nodes in different areas are not synchronized, and transmission of protocol packet cannot be implemented.

Certainly, the first area and the second area may be different areas included in different processes or included in a same process.

(6) For a network segment and a subnet, one area may include one or more network segments. One network segment may include a plurality of subnets. Network segment identifiers may be used to distinguish between different network segments. Subnet identifiers are used to distinguish between different subnets. Before the network segment and the subnet are introduced, an IP address is introduced first.

Internet Protocol version 4 (IPv4) is used as an example. An IPv4 address is 192.168.1.1/32, and another IPv4 address is 192.168.1.2/32. The two IPv4 addresses are included in a same network segment 192.168.1.0/24, and 192.168.1.0/24 is a network segment identifier of the network segment. "/24" in an IPv4 address indicates a quantity of bits of a subnet mask. A specific value of a quantity of bits of the subnet mask is not limited, and may be 24 bits, 32 bits, or the like. Specifically, when IPv4 addresses are respectively 192.168.1.1/32 and 192.168.2.2/32, it can be determined in a specific manner that the two IPv4 addresses belong to a same network segment. A specific determining manner is not described in the embodiments. Alternatively, an IPv4 address is 192.168.2.1/32, and another IPv4 address is 192.168.2.2/32. The two IPv4 addresses are included in a same network segment 192.168.2.0/24, and 192.168.2.0/24 is a network segment identifier of the network segment.

192.168.1.0/24 and 192.168.2.0/24 belong to different network segments.

Internet Protocol version 6 (IPv6) is used as an example. To increase a quantity of network addresses, compared with a quantity of bits of an IPv4 address, a quantity of bits of an IPv6 address is increased, for example, is 128. A 128-bit IPv6 address is used as an example. For ease of description, a 128-bit IPv6 address is divided into eight 16-bit binary segments. Each 16-bit binary segment is represented by using a four-bit hexadecimal number, and neighboring binary segments are separated by ":" (colon). For example, an IPv6 address is represented as 1000:0000:0000:0000: 000A:000B:000C:000D. 0 may be omitted, and therefore, the IPv6 address may be abbreviated to 1000:0:0:0:A:B:C: D. For further simplification, neighboring 0s are replaced by double colons "::". Therefore, the IPv6 address is finally simplified into 1000::A:B:C:D. A 128-bit IPv6 address is used as an example above, and a same principle is applied to an IPv6 address including another quantity of bits. This is not limited in the embodiments.

Similar to IPv4, it is assumed that a plurality of IPv6 addresses are respectively 4:1::/64, 4:2::/64, 4:3::/64, 4:4::/64, and 4:5::/64. The plurality of IPv6 addresses are included in a same network segment 4:0::/32 (because one 0 is included in the middle, it may be further abbreviated to 4::/32), and 4::/32 is a network segment identifier of the network segment. Alternatively, it is assumed that a plurality of IPv6 addresses are respectively 3:1::/64 and 3:2::/64. The plurality of IPv6 addresses belong to a same network segment 3:0::/32 (because one 0 is included in the middle, it may be further abbreviated to 3::/32), and 3::/32 is a network segment identifier of the network segment.

Therefore, in the embodiments, a network segment identifier is used to identify a network segment. The IPv4 is used as an example. A network segment identifier may be, for example, 192.168.1.0/24, and a subnet identifier may be 192.168.1.1/32, 192.168.1.2/32, or the like. The IPv6 is used as an example. A network segment identifier may be 4::/32, and a subnet identifier may be 4:1::/64, 4:2::/64, 4:3::/64, 4:4::/64, 4:5::/64, or the like.

(7) For a flexible algorithm (flex-algo), according to a definition in draft-ietf-lsr-flex-algo, flex-algo is associated to a segment routing (SR) prefix segment identifier (prefix-SID) or a Segment Routing over IPv6 (SRv6) location. Each such Prefix-SID or SRv6 locator then represents a path that is computed according to the identified Flex-Algorithm. each algorithm defines one rule, and a node may calculate different topologies based on rules of corresponding algorithms, to transmit a packet.

Different from a conventional algorithm (for example, an IGP or an SPF), another constraint may be added to the flex-algo based on the conventional algorithm, to calculate a topology. The constraint, namely, flexible algorithm definition (FAD), includes a group of parameters, for example, includes three parameters, namely, a metric type, a calc-type, and a topo-constraint.

To facilitate distinguishing between the conventional algorithm and the flex-algo, each algorithm is identified by using a corresponding algorithm identifier. For example, values ranging from 0 to 255 are used to identify different algorithms. For example, 0 is used to identify SPF, 1 is used to identify strict SPF, and 128 to 255 are used to identify different flex-algos. For example, 128 is used to identify a flex-algo (briefly referred to as a flex-algo 128 below), and 129 is used to identify another flex-algo (briefly referred to as a flex-algo 129 below). FAD of the flex-algo 128 includes: 1. a metric type: delay; 2. a calc-type: spf; and 3. a topo-constraint: exclude red. FAD of the flex-algo 129 includes: 1. a metric type: to metric; 2. a calc-type: spf; and 3. a topo-constraint: exclude red.

A protocol packet may be transmitted between nodes having a same flex-algo. For example, referring to FIG. 1A, both a node 0 and a node 9 have the flex-algo 128 and the flex-algo 129. A node 1 to a node 4 have the flex-algo 128, and a node 5 to a node 8 have the flex-algo 129. When the node 0 calculates a topology according to the flex-algo 128, the topology includes one or more nodes in the node 1 to the node 4. To be specific, the node 0 sends a protocol packet to the node 9 by using one or more nodes in the node 1 to the node 4. When the node 0 calculates a topology according to the flex-algo 129, the topology may include one or more nodes in the node 5 to the node 8. To be specific, the node 0 sends a protocol packet to the node 9 by using one or more nodes in the node 5 to the node 8.

(8) Type-length-value (TLV) is an information encoding mode, and may also be understood as a format for encapsulating a packet, where value represents a data area (or an information area) of the packet, and is used to store information that needs to be sent, type represents a type of value in the packet, and length indicates a size of value (for example, a byte value).

For example, the original routing information or the aggregated routing information described above may be encapsulated based on the subnet identifier TLV. For example, the original routing information or the aggregated routing information can be encapsulated based on a SRv6 locator TLV.

(9) "A plurality of" used in the embodiments means at least two. It should be noted that in the descriptions of the embodiments, terms such as "first" and "second" are merely used to distinguish between descriptions, but cannot be understood as indicating or implying relative importance, and cannot be understood as indicating or implying a sequence.

The terms used in the following embodiments are merely for the purpose of describing a specific embodiment, but are not intended to limit this disclosure. The terms "one", "a", and "this" of singular forms are also intended to include also such expressions as "one or more", unless otherwise specified in the context clearly. It should be further understood that in the embodiments, "one or more" means one, two, or more. The term "and/or" describes an association relationship between associated objects and represents that three relationships may exist. For example, A and/or B may represent the following three cases: Only A exists, both A and B exist, and only B exists, where each of A and B may be in a singular form or a plural form. The character "/" generally indicates an "or" relationship between the associated objects.

References to "an embodiment", "some embodiments", or the like mean that specific characteristics, structures, or features described with reference to the embodiment are included in one or more embodiments. Therefore, the statements "in an embodiment", "in some embodiments", "in some other embodiments", "in some other embodiments", and the like in different parts of this specification do not necessarily refer to a same embodiment, but mean "one or more but not all embodiments", unless otherwise specially emphasized. The terms "including", "containing", "having", and variations thereof mean "including but not limited to", unless otherwise specifically emphasized.

The foregoing describes the related terms used in the embodiments. The following describes the technical solutions in the embodiments with reference to the accompanying drawings.

Figure 1B:
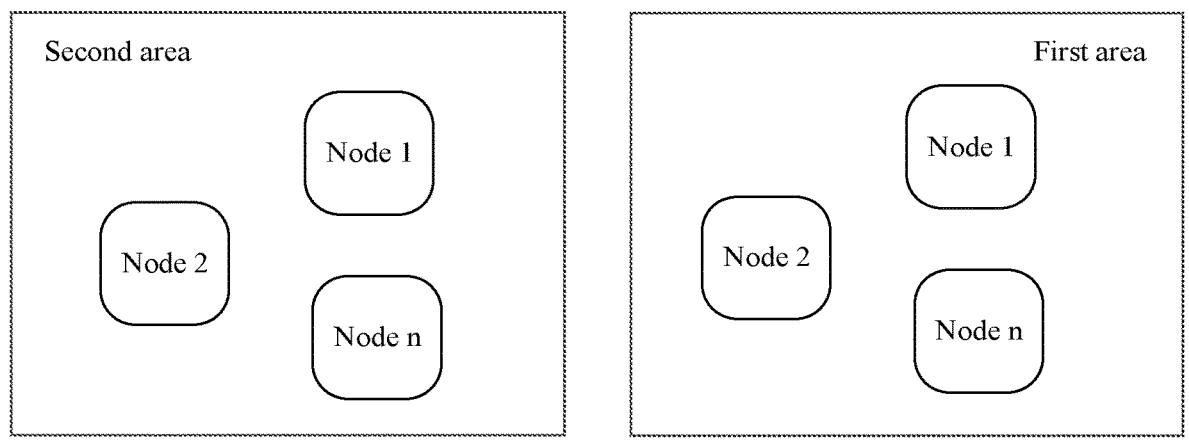
FIG. 1B is a first schematic diagram of a network architecture according to an embodiment.

FIG. 1B is a schematic diagram of a network (or a network architecture) according to an embodiment. The network includes two areas, namely, a first area and a second area. The first area includes a plurality of nodes, and the second area includes a plurality of nodes. The first area and the second area are isolated from each other. In other words, LSDBs of the first area and the second area are independent of each other and are not synchronized. Therefore, the first area and the second area need routing "flooding" to implement LSDB synchronization between the two areas, to implement cross-area packet transmission. It should be noted that in FIG. 1B, that the network includes two areas is used as an example. Actually, the network may include more areas.

In a possible routing "flooding" manner, that the first area "floods" the second area is used as an example. Each node in the first area sends original routing information of the node to the second area. Each node may correspond to one or more pieces of original routing information. It is assumed that the first area includes a plurality of nodes, and each of the plurality of nodes corresponds to one or more pieces of original routing information. Then, the first area needs to "flood" the second area with a large amount of original routing information. As a result, the flooding efficiency is relatively low, and there are a large quantity of routing entries.

In this embodiment, the first area may send aggregated routing information to the second area, and the aggregated routing information is obtained by aggregating a plurality of pieces of original routing information in the first area. Therefore, there is no need to send the plurality of pieces of original routing information aggregated in the aggregated routing information to the second area, to reduce an amount of routing information that needs to be sent, improve the flooding efficiency, and reduce a quantity of routing entries.

Figure 2:
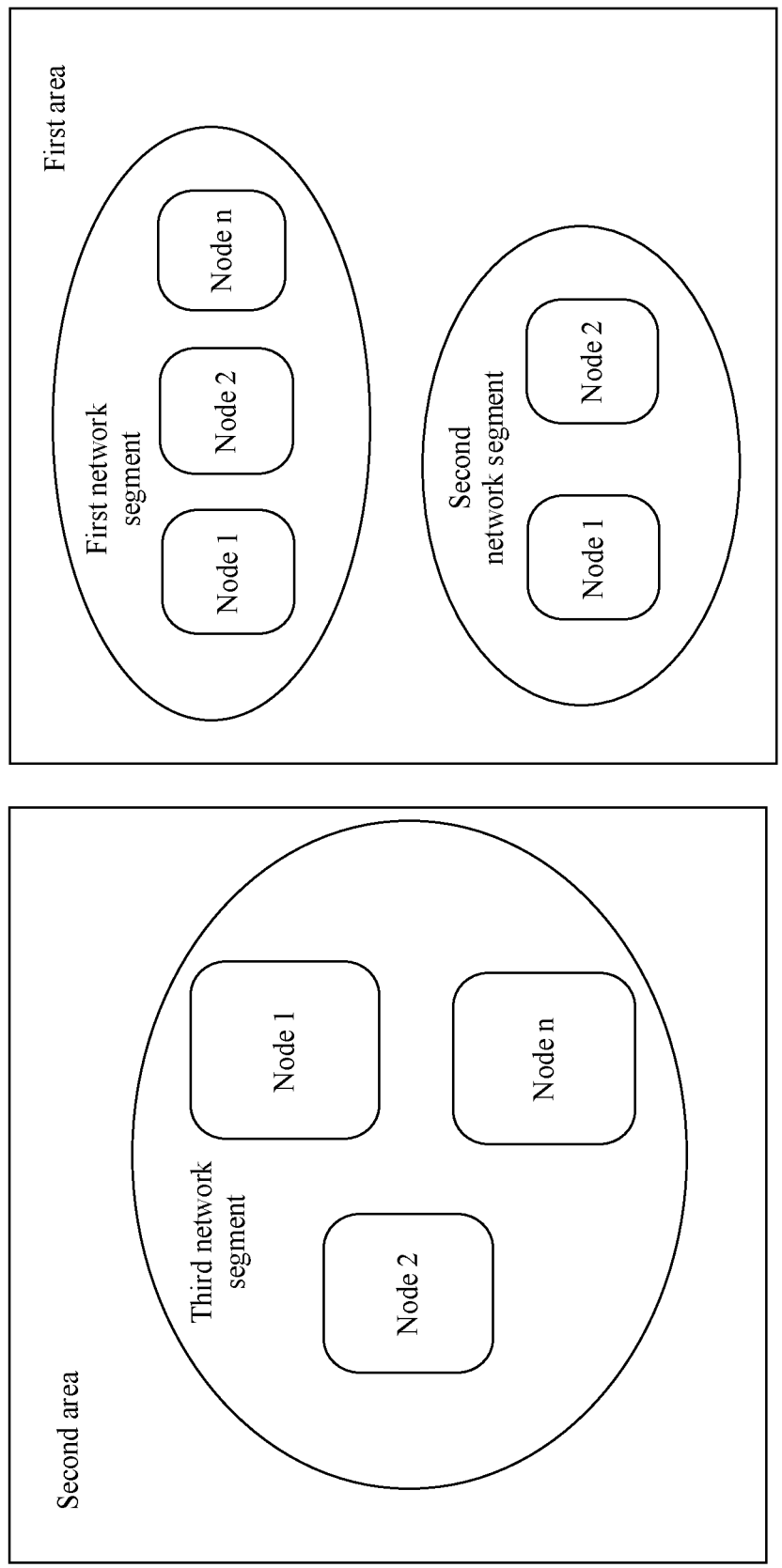
FIG. 2 is a second schematic diagram of a network architecture according to an embodiment.

FIG. 2 is another schematic diagram of a network (or a network architecture) according to an embodiment. The network includes two areas, namely, a first area and a second area. The first area includes one or more nodes, and the second area includes one or more nodes. Different from the network shown in FIG. 1B, the first area in the network shown in FIG. 2 includes a plurality of network segments, namely, a first network segment and a second network segment, and one network segment includes one or more nodes. Therefore, the network shown in FIG. 2 may also be understood as refinement of the network shown in FIG. 1B. It should be understood that in FIG. 2, that the first area includes two network segments is used as an example. Actually, the first area may include more or fewer network segments, and the second area may also include more network segments.

Similarly, the first area and the second area need to perform routing "flooding". In this embodiment, the first area sends aggregated routing information to the second area. The aggregated routing information is obtained by aggregating a plurality of pieces of original routing information in the first area, the plurality of pieces of original routing information correspond to N nodes in a network segment, the network segment is in the first area, and the N nodes have a same flexible algorithm flex-algo. For example, the aggregated routing information may be obtained by aggregating a plurality of pieces of original routing information in the first network segment in FIG. 2. Therefore, the first area does not need to send the plurality of pieces of original routing information to the second area, to reduce an amount of routing information that needs to be sent, improve the flooding efficiency, and reduce a quantity of routing entries.

The technical solutions provided in the embodiments are applicable to IPv4, IPv6, SRv6, or a future possible internet protocol.

Figure 3:
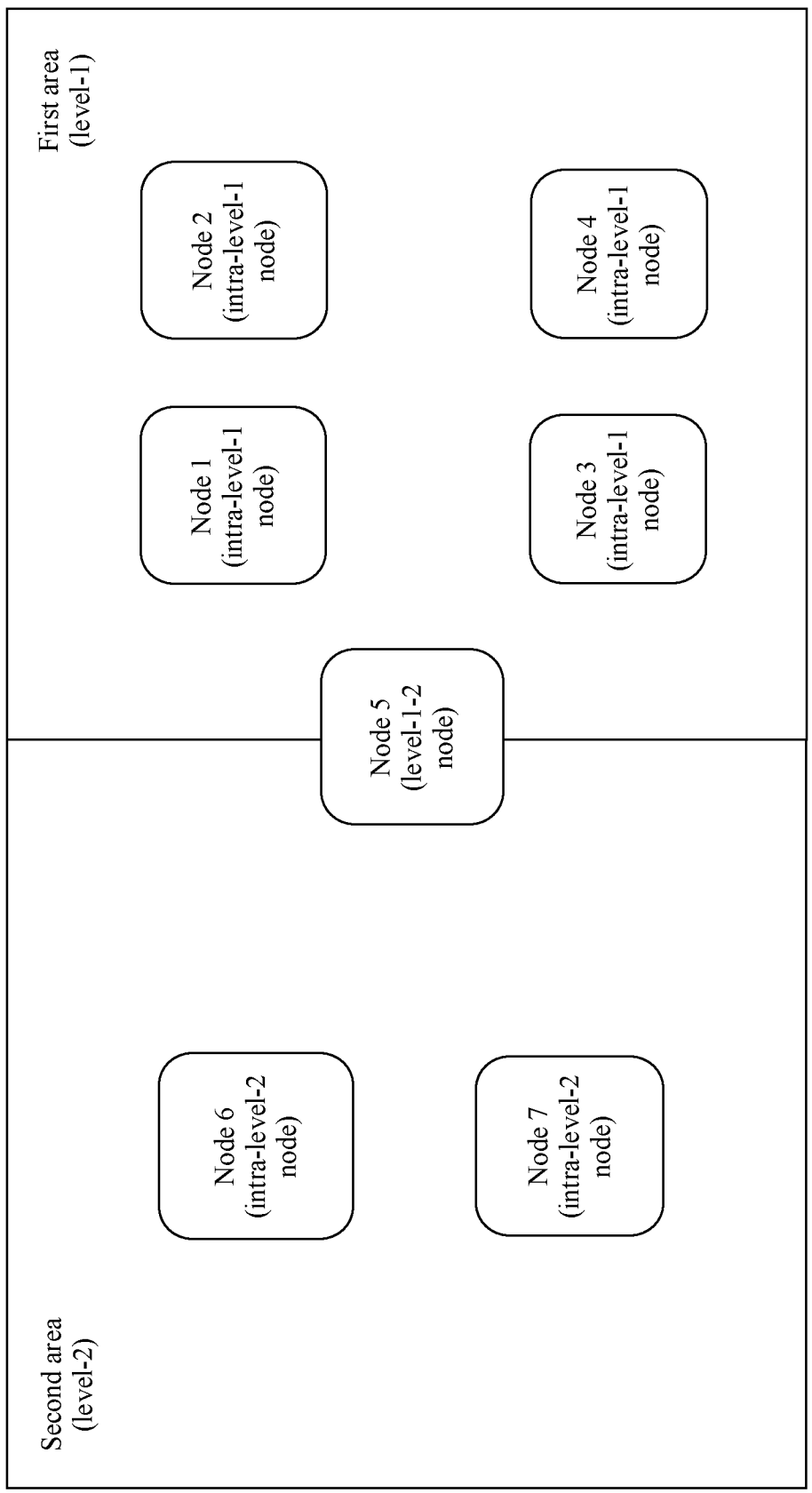
FIG. 3 is a third schematic diagram of a network architecture according to an embodiment.

In an example, the network (for example, the network shown in FIG. 1B or FIG. 2) provided in the embodiments may be a two-level architecture of IS-IS. For example, as shown in FIG. 3, the network includes a first area and a second area, the first area and the second area belong to different levels, and no protocol packet can be transmitted between nodes in the two levels. The first area may be represented as level-1, and the second area may be represented as level-2. Generally, one area in the first area and the second area is a backbone area, and the other area is a regular area. For example, the first area level-1 is a regular area, and the second area level-2 is a backbone area. The level-1 needs to be connected to a backbone network by using the level-2.

The level-1 includes an intra-level-1 area node (briefly referred to as an intra-level-1 node) and an area connection node. For example, in FIG. 3, a node 1 to a node 4 are intra-level-1 nodes, and a node 5 is the area connection node. Similarly, the level-2 includes an intra-level-2 area node (briefly referred to as an intra-level-2 node) and the area connection node. For example, in FIG. 3, a node 6 and a node 7 are intra-level-2 nodes, and the node 5 is the area connection node. The area connection node may be represented as a level-1-2 node, is located in both the level-1 and the level-2, and represents a connection node of the level-1 and the level-2. For example, a node in the level-1 may send a packet to a node in the level-2 by using the level-1-2 node.

It should be noted that although different network segments in the first area and the second area are not shown in FIG. 3, actually, the first area may include one or more network segments, and the second area may also include one or more network segments. The node in the first area and the node in the second area belong to different network segments. For example, the intra-level-1 node and the intra-level-2 node belong to different network segments.

Figure 4:
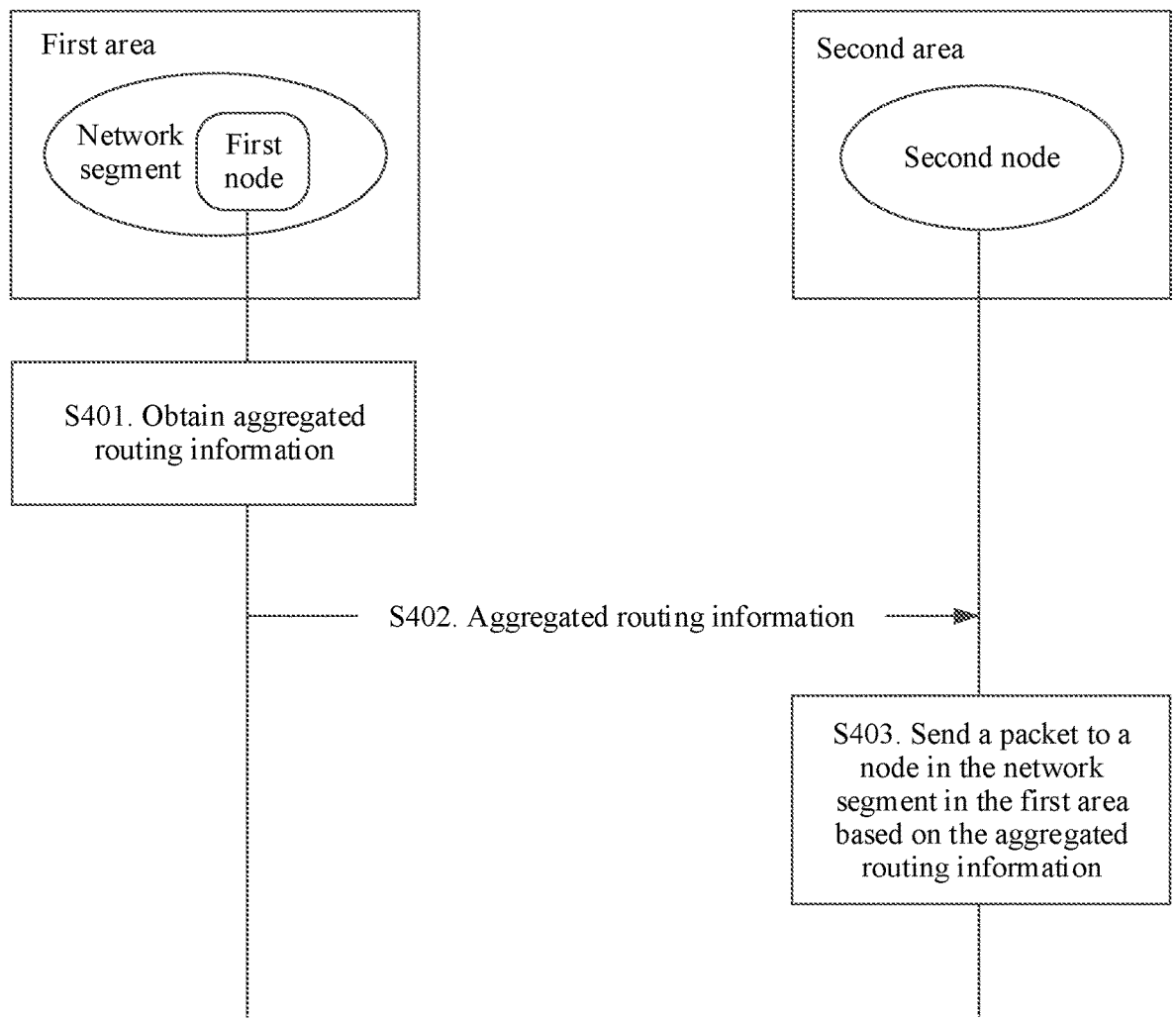
FIG. 4 is a schematic diagram of a routing information sending method according to an embodiment.

FIG. 4 is a schematic diagram of a routing information sending method according to an embodiment. The method is applicable to the network shown in FIG. 2 or FIG. 3, and the network includes a first area and a second area. FIG. 4 is described by using an example in which the first area "floods" the second area. As shown in FIG. 4, a process of the method includes the following steps.

S401. A first node in the first area obtains aggregated routing information.

In this embodiment, the aggregated routing information is obtained by aggregating a plurality of pieces of original routing information in a network segment, the network segment is included in the first area, and nodes corresponding to the plurality of pieces of original routing information have a same flexible algorithm flex-algo or same flex-algos. FIG. 3 is used as an example. It is assumed that a node 1 to a node 5 in the first area are nodes in a same network segment, and the node 1 to the node 5 have a same flex-algo, for example, a flex-algo 128. Then, original routing information of the node 1 to the node 5 is aggregated to obtain aggregated routing information.

Considering that the first area may include one or more network segments, description is provided below by using an example in which the first area includes one network segment and an example in which the first area includes a plurality of network segments.

In a first example, the first area includes one network segment.

FIG. 3 is used as an example. The first area includes one network segment, and the network segment includes a plurality of nodes, namely, the node 1 to the node 5.

In a first case, the first node is an area connection node, namely, the node 5. The area connection node may obtain the aggregated routing information in a plurality of manners, for example, the following manner 1 or manner 2.

Manner 1: The area connection node generates the aggregated routing information on its own. In this case, that the first node obtains the aggregated routing information means that the first node generates the aggregated routing information.

Manner 2: The area connection node receives the aggregated routing information from another node. In this case, that the first node obtains the aggregated routing information means that the first node receives the aggregated routing information.

For the foregoing manner 1, in a possible implementation, each node in the first area sends original routing information of the node to all other nodes in the first area. In this way, each node in the first area learns the original routing information of all the other nodes in the first area. Therefore, the area connection node, namely, the node 5, can learn original routing information of each of the node 1 to the node 4, and the original routing information of each node includes an algorithm identifier and a subnet identifier. The subnet identifier can be an subnet identifier in SRv6 network, which can be called SRv6 locator.

For example, the original routing information is shown in Table 1:

TABLE 1

| Node | Original routing information | |
|---|---|---|
| | Algorithm identifier | Subnet identifier (locator) |
| Node 1 | 128 | 4:1::/64 |
| Node 2 | 128 | 4:2::/64 |
| Node 3 | 128 | 4:3::/64 |
| Node 4 | 128 | 4:4::/64 |
| Node 5 | 128 | 4:5::/64 |

In Table 1, that one node corresponds to one piece of original routing information is used as an example. Actually, one node may correspond to a plurality of pieces of original routing information. For example, the node 1 corresponds to original routing information 1 and original routing information 2. In the original routing information 1, an algorithm identifier is 128 and a subnet identifier is 4:1::/64. In the original routing information 2, an algorithm identifier is 129 and a subnet identifier is 4:6::/64.

Still referring to Table 1, the original routing information of each node includes the algorithm identifier and the subnet identifier, the algorithm identifier is used to indicate a flex-algo of the node, and the subnet identifier is used to indicate a subnet in which the node is located. Therefore, after obtaining the original routing information of each node, the first node may determine the flexible algorithm of the node by using the algorithm identifier in the original routing information. To be specific, nodes with a same algorithm identifier in the original routing information have a same flexible algorithm. The first node may determine, by using the subnet identifier in the original routing information, a network segment in which each node is located, to determine which nodes are in a same network segment. A process of determining, by using subnet identifiers, whether two nodes are in a same network segment has been described above, and details are not described herein again.

After obtaining the original routing information of the node 1 to the node 4, the node 5 (the first node) aggregates a plurality of pieces of original routing information including a same algorithm identifier, to obtain aggregated routing information. Optionally, the node 5 may further determine, by using the subnet identifiers, whether the node 1 to the node 4 are in a same network segment, and if the node 1 to the node 4 are in the same network segment, aggregate the original routing information of the node 1 to the node 4 to obtain aggregated routing information.

In another possible implementation, FIG. 3 is still used as an example. It is assumed that a sending path of original routing information sequentially passes through the node 2, the node 4, the node 3, the node 1, and the node 5. To be specific, the node 2 sends the original routing information of the node 2 to the node 4. After receiving the original routing information of the node 2, the node 4 aggregates the original routing information of the node 4 and the original routing information of the node 2 to obtain aggregated routing information 1, and the node 4 sends the aggregated routing information 1 to the node 3. The node 3 further aggregates the original routing information of the node 3 and the aggregated routing information 1 to obtain aggregated routing information 2, and the node 3 sends the aggregated routing information 2 to the node 1. The node 1 further aggregates the original routing information of the node 1 and the aggregated routing information 2 to obtain aggregated routing information 3, and the node 1 sends the aggregated routing information 3 to the node 5. The node 5 further aggregates the original routing information of the node 5 and the aggregated routing information 3 to obtain final aggregated routing information. In this case, that the first node obtains the aggregated routing information means that the first node generates the aggregated routing information.

For the foregoing manner 2, in a possible implementation, another node in the first area other than the area connection node is configured to generate aggregated routing information, and then send the aggregated routing information to the area connection node (the first node). For example, FIG. 3 is still used as an example. The node 1 generates the aggregated routing information and sends the aggregated routing information to the node 5. A manner of generating, by the node 1, the aggregated routing information is similar to the foregoing manner of generating, by the node 5, the aggregated routing information, and details are not described again. Alternatively, FIG. 3 is still used as an example. Alternatively, the node 2 may generate the aggregated routing information, and then send the aggregated routing information to the node 5 (for example, the aggregated routing information is sent to the node 5 by using the node 1). In this case, that the first node obtains the aggregated routing information means that the first node receives the aggregated routing information.

In this embodiment, the aggregated routing information may carry the algorithm identifier used to indicate the flex-algo and a network segment identifier used to indicate the network segment. For example, Table 2 shows an example of aggregating a plurality of pieces of original routing information to obtain aggregated routing information.

TABLE 2

| | Original routing information | | Aggregated routing information | |
|---|---|---|---|---|
| Node | Algorithm identifier | Subnet identifier (locator) | Algorithm identifier | Network segment identifier |
| Node 1 | 128 | 4:1::/64 | 128 | 4::/32 |
| Node 2 | 128 | 4:2::/64 | | |
| Node 3 | 128 | 4:3::/64 | | |
| Node 4 | 128 | 4:4::/64 | | |
| Node 5 | 128 | 4:5::/64 | | |

In this case, the first area sends one piece of aggregated routing information to the second area. Compared with other approaches (the first area needs to send the respective original routing information of the node 1 to the node 5, namely, routing orientations of the five nodes, to the second area), an amount of routing information is reduced, efficiency is improved, and routing entries are reduced.

In the foregoing examples (Table 1 and Table 2), that the node 1 to the node 5 have the same flex-algo is used as an example. In some cases, the node 1 to the node 5 may have different flex-algos. For example, refer to Table 3:

TABLE 3

| | Original routing information | | Aggregated routing information | |
|---|---|---|---|---|
| Node | Algorithm identifier | Subnet identifier (locator) | Algorithm identifier | Network segment identifier |
| Node 1 | 128 | 4:1::/64 | 128 | 4::/32 |
| Node 2 | 128 | 4:2::/64 | | |
| Node 3 | 128 | 4:3::/64 | | |
| Node 4 | 129 | 4:4::/64 | 129 | 4::/32 |
| Node 5 | 129 | 4:5::/64 | | |

The node 1 to the node 3 have the flex-algo 128, and the node 4 and the node 5 have a flex-algo 129. In this case, the original routing information of the node 1 to the node 3 is aggregated to obtain one piece of aggregated routing information, and in the aggregated routing information, an algorithm identifier is 128 and a network segment identifier is 4::/32. The original routing information of the node 4 and the node 5 is aggregated to obtain another piece of aggregated routing information, and in the aggregated routing information, an algorithm identifier is 129 and a network segment identifier is 4::/32.

In this case, the first area sends two pieces of aggregated routing information to the second area. Compared with other approaches (the first area needs to send the respective original routing information of the node 1 to the node 5, namely, routing orientations of the five nodes, to the second area), an amount of routing information is reduced, efficiency is improved, and routing entries are reduced.

Considering a possible case, the first area may include one or more nodes whose original routing information is not aggregated in aggregated routing information. For example, FIG. 3 is still used as an example. The node 1 has the flex-algo 129, and the node 2 to the node 5 have the flex-algo 128. Original routing information of the node 2 to the node 5 is aggregated to obtain aggregated routing information, and the aggregated routing information does not include original routing information of the node 1. In this case, in addition to the aggregated routing information, the first area may send the original routing information of the node 1 to the second area.

Figure 5:
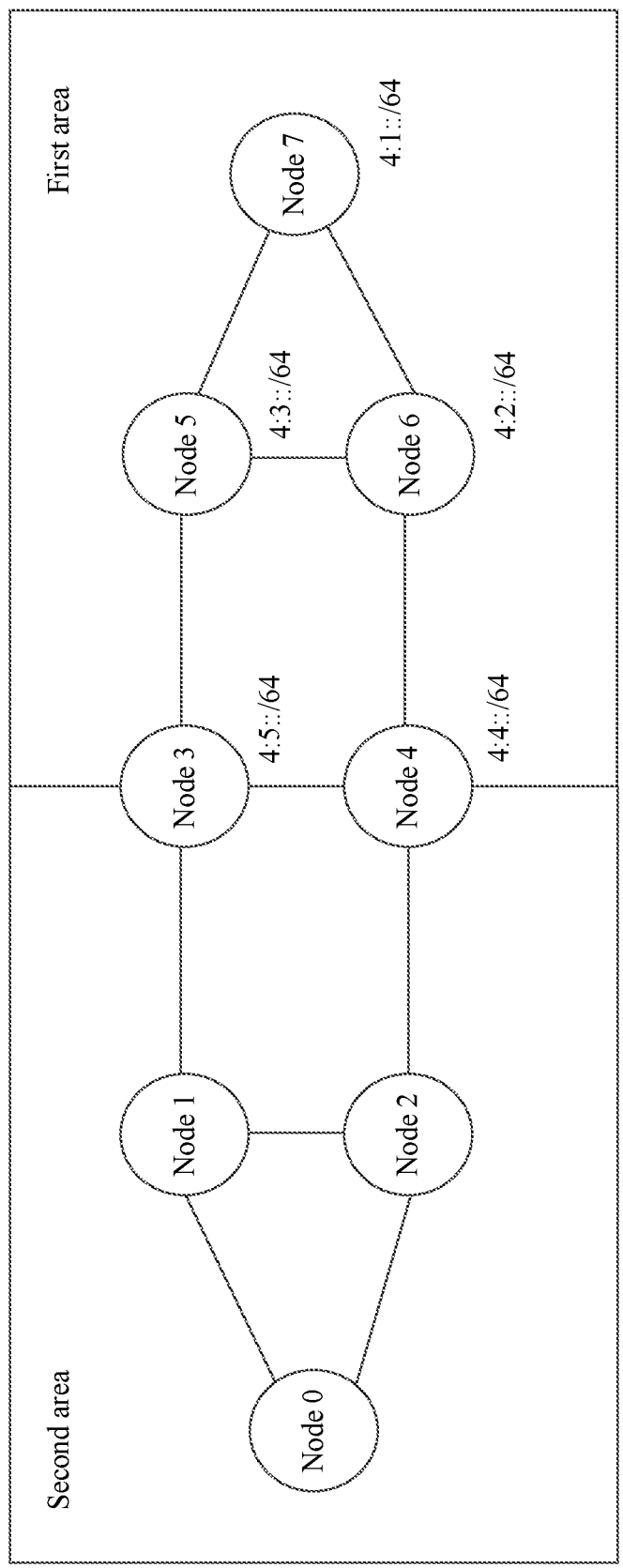
FIG. 5 is a fourth schematic diagram of a network architecture according to an embodiment.

For the first case (the first node is the area connection node), considering a possible case, there may be more than one area connection node. For example, as shown in FIG. 5, the first area includes a node 3 to a node 7, the second area includes a node 0 to a node 4, and the node 3 and the node 4 are area connection nodes. In this case, the first area may determine (for example, randomly select) one area connection node from the plurality of area connection nodes. The area connection node is the first node. For example, the node 3 is used as the first node, and the node 3 aggregates original routing information of the node 3 to the node 7 to obtain aggregated routing information, and sends the aggregated routing information to the second area.

Alternatively, two area connection nodes are used as an example. One area connection node aggregates original routing information of some nodes to obtain one piece of aggregated routing information, and the nodes have a same flex-algo, for example, the flex-algo 128. The other area connection node aggregates original routing information of the other nodes to obtain another piece of aggregated routing information, and the nodes have a same flex-algo, for example, the flex-algo 129.

In a second case, the first node is another node (which may be referred to as a non-area connection node) in the first area other than an area connection node. FIG. 3 is still used as an example. The first node is any node in the node 1 to the node 4. In this case, the first node obtains the aggregated routing information in a plurality of manners. For example, the first node generates the aggregated routing information on its own. Alternatively, the first node receives the aggregated routing information from another node. A specific implementation may be similar to the first case, and details are not described herein again. In this case, that the first node obtains the aggregated routing information includes that the first node generates the aggregated routing information or that the first node receives the aggregated routing information.

It should be noted that in this case, the first node is a non-area connection node, and after obtaining the aggregated routing information, the first node may send the aggregated routing information to the second area by using the area connection node.

In a second example, the first area includes a plurality of network segments.

Figure 6:
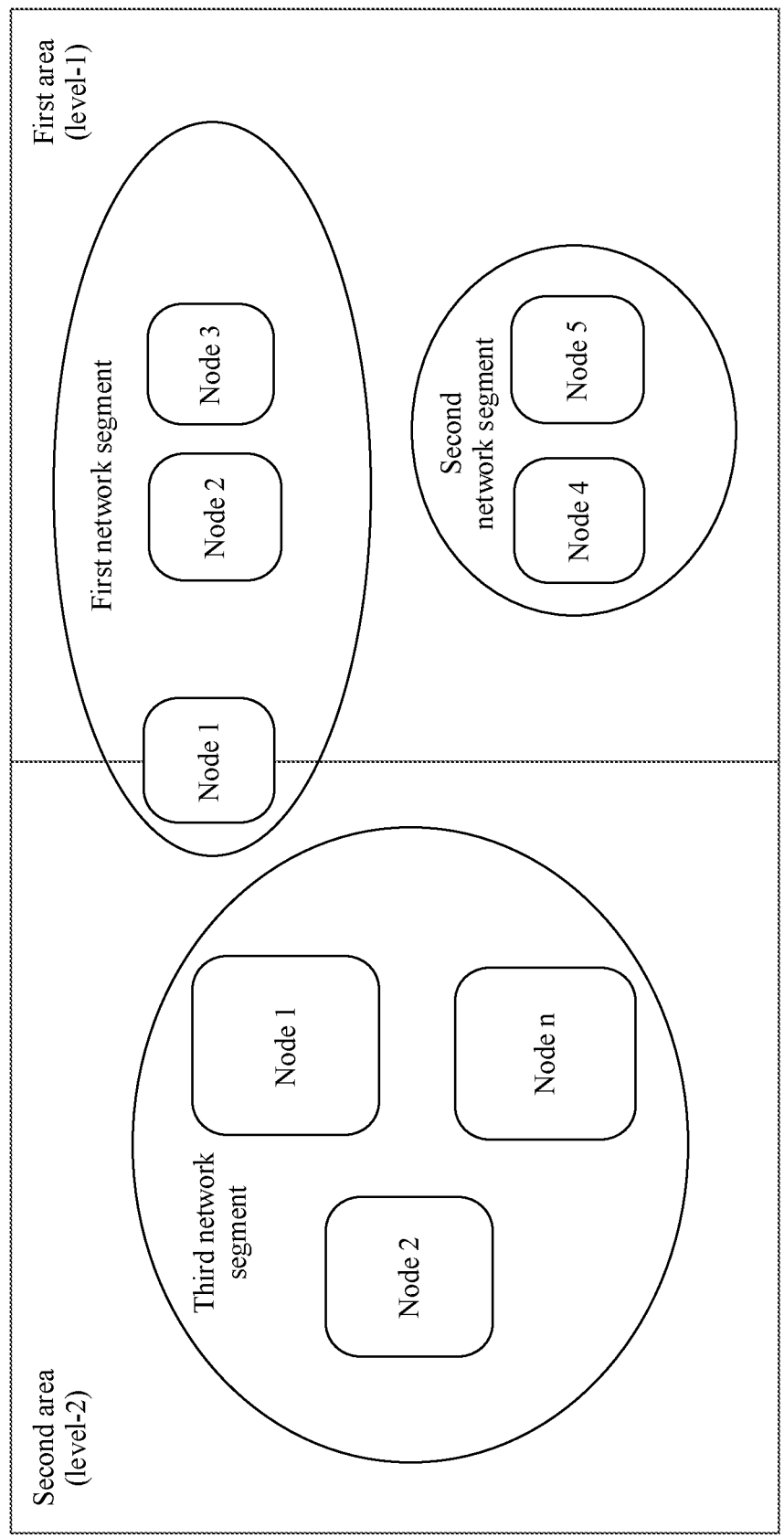
FIG. 6 is a fifth schematic diagram of a network architecture according to an embodiment.

As shown in FIG. 6, the first area includes a plurality of network segments, for example, a first network segment and a second network segment. The first network segment includes a node 1 to a node 3, and the node 1 is an area connection node. The second network segment includes a node 4 and a node 5.

In a possible case, a first node in the first network segment obtains first aggregated routing information. The first aggregated routing information is obtained by aggregating original routing information of a plurality of nodes in the first network segment, and the plurality of nodes in the first network segment have a same flexible algorithm. The first node may be any node in the first network segment. For example, the first node may be the area connection node, namely, the node 1. It is assumed that the node 1 and the node 2 have a same flex-algo, for example, a flex-algo 129. Then, the node 1 aggregates original routing information of the node 1 and the node 2 to obtain aggregated routing information. A first node in the second network segment obtains second aggregated routing information. The second aggregated routing information is obtained by aggregating original routing information of a plurality of nodes in the second network segment, and the plurality of nodes in the second network segment have a same flexible algorithm. The first node may be any node in the second network segment, for example, the node 4.

In other words, the node in each network segment generates aggregated routing information corresponding to the network segment (each network segment may correspond to one or more pieces of aggregated routing information).

For example, in a possible scenario, first network segment includes an area connection node, and the second network segment also includes an area connection node. The area connection node in the first network segment generates aggregated routing information corresponding to the first network segment and sends the aggregated routing information to the second area, or another node in the first network segment generates aggregated routing information corresponding to the first network segment and sends the aggregated routing information to the second area by using the area connection node. The area connection node in the second network segment generates aggregated routing information corresponding to the second network segment, or another node in the second network segment generates aggregated routing information corresponding to the second network segment and sends the aggregated routing information to the second area by using the area connection node in the second network segment.

Therefore, the first area may send a plurality of pieces of aggregated routing information to the second area, and the plurality of pieces of aggregated routing information may correspond to different network segments.

In some other possible cases, the first node in the first network segment obtains the first aggregated routing information and the second aggregated routing information; or the first node in the second network segment obtains the first aggregated routing information and the second aggregated routing information; or the first node in the second network segment obtains the first aggregated routing information, and the first node in the first network segment obtains the second aggregated routing information; or the like. This is not limited in this embodiment.

For example, in a possible scenario, still referring to FIG. 6, the first network segment includes an area connection node, and the second network segment does not include an area connection node. Therefore, the first node (for example, the area connection node) in the first network segment generates the second aggregated routing information and sends the second aggregated routing information to the second area. Alternatively, a node (a non-area connection node) in the second network segment obtains the second aggregated routing information. Because the second network segment does not include an area connection node, the second network segment may send the second aggregated routing information to the first network segment, so that the second aggregated routing information is sent to the second area by using the area connection node in the first network segment.

S402. The first node in the first area sends the aggregated routing information to the second area.

FIG. 3 is used as an example. The first node may be any node in the network segment in the first area. For example, when the first node is the area connection node (for example, the node 5), the first node sends the aggregated routing information to the second area. For example, the first node sends the aggregated routing information to another node, for example, the node 6, in the second area other than the area connection node (namely, the node 5), so that the aggregated routing information is sent to the other node in the second area by using the node 6. For another example, when the first node is another node, for example, the node 1, other than the area connection node, after obtaining the aggregated routing information, the node 1 sends the aggregated routing information to the area connection node, namely, the node 5, and the node 5 sends the aggregated routing information to the second area.

In some embodiments, the first area includes one or more nodes whose original routing information is not aggregated in the aggregated routing information. FIG. 5 is used as an example. In addition to the node 3 to the node 7, the first area further includes a node 8 (not shown in the figure). If a flexible algorithm of the node 8 is different from that of the node 3 to the node 7, or the node 8 is not in a network segment corresponding to the node 3 to the node 7, the original routing information of the node 3 to the node 7 is aggregated in the aggregated routing information, but original routing information of the node 8 is not aggregated in the aggregated routing information. Therefore, in addition to the aggregated routing information, the first area further needs to send the original routing information of the node 8 to the second area.

The following describes, by using FIG. 5 as an example, beneficial effects of the routing "flooding" manner provided.

It is assumed that the first area includes M nodes, and M is an integer greater than or equal to 2. N flexible algorithms are configured for each node, where N is an integer greater than or equal to 1 and less than or equal to 128. P subnet identifiers may be configured for each node, where P is an integer greater than or equal to 1. If the first area sends original routing information of each node to the second area, a total amount of original routing information that needs to be sent by the first area is M*N*P.

Based on the technical solution provided in this embodiment, if the M nodes in the first area are located in a same network segment, and the M nodes have a same flexible algorithm, original routing information of the M nodes is aggregated into one piece of aggregated routing information. In this case, the first area needs to send only one piece of aggregated routing information, to greatly reduce an amount of sent routing information and a quantity of routing entries.

S403. The second area sends a packet to the plurality of nodes in the network segment in the first area based on the aggregated routing information.

Therefore, after obtaining the aggregated routing information from the first area, the second area may send the packet to the first area based on the aggregated routing information.

Figure 7:
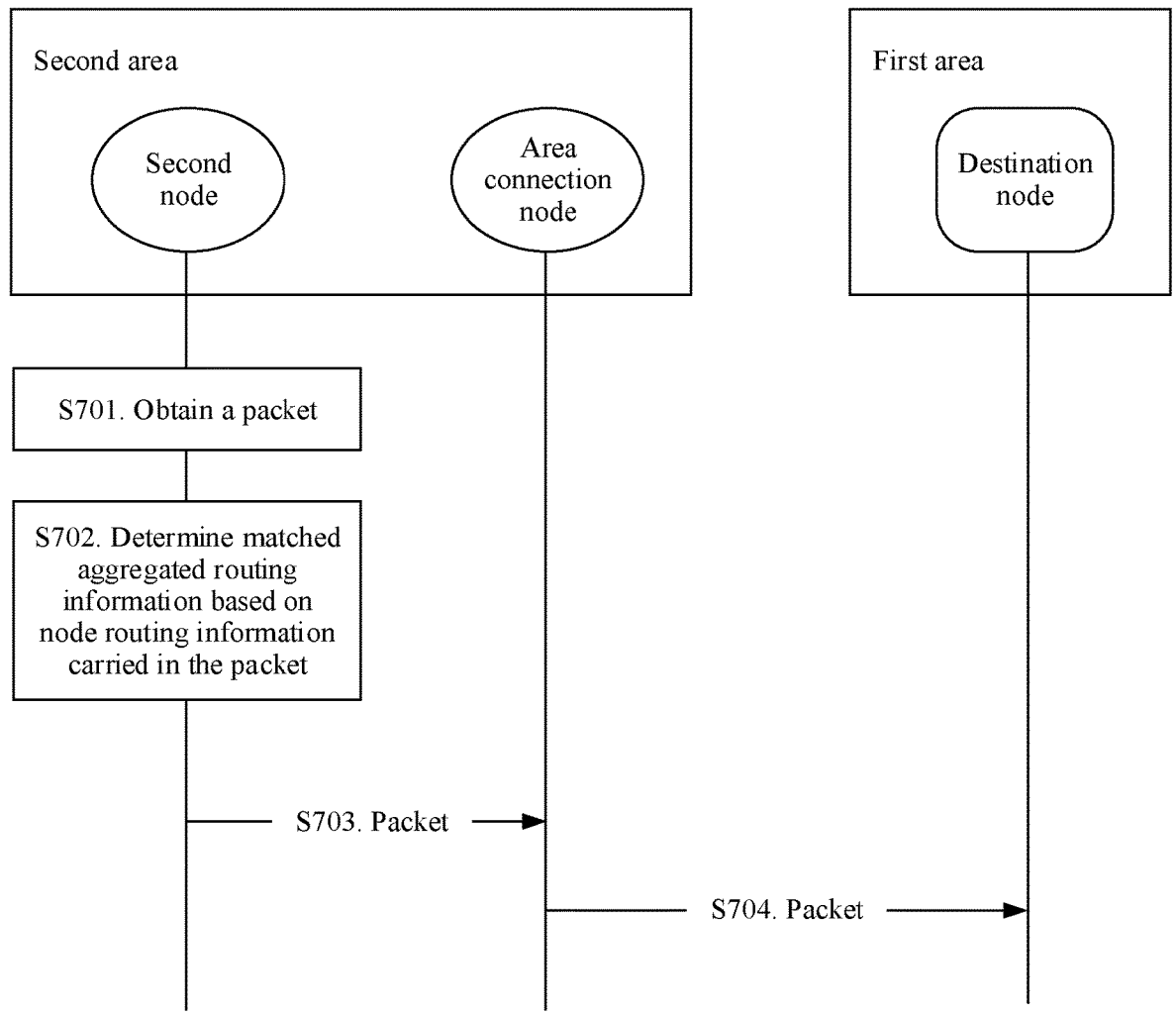
FIG. 7 is a schematic diagram of a packet sending method according to an embodiment.

FIG. 7 is a schematic diagram of a packet sending method according to an embodiment. Steps in the method process may also be understood as detailed steps of step 203 in FIG. 2. The method includes the following steps.

S701. A second node obtains a packet.

The second node is a node included in the second area. In some embodiments, the packet may carry original routing information. For example, the original routing information includes an algorithm identifier 128 and a subnet identifier 4:1::/64. To be specific, a destination node of the packet is a node, namely, a node 7 (FIG. 5 is used as an example), in a network segment in a first area. The packet may be a protocol packet or a data packet.

S702. The second node determines, based on the original routing information carried in the packet, aggregated routing information matching the packet.

It should be understood that the second node obtains a plurality of pieces of aggregated routing information, and the plurality of pieces of aggregated routing information may come from different areas, or come from one area (for example, the first area), or the like. Therefore, after receiving the packet, the second node may determine, from many aggregated routing information based on the original routing information carried in the packet, the aggregated routing information matching the packet.

For example, it is assumed that the second node stores a plurality of pieces of aggregated routing information, referring to Table 4.

TABLE 4

| Aggregated routing information | Content |
| --- | --- |
| Aggregated routing information 1 | Algorithm identifier 128, network segment identifier 4::/32 |
| Aggregated routing information 2 | Algorithm identifier 129, network segment identifier 5::/32 |

The aggregated routing information that matches the packet and that is determined by the second node meets the following conditions: An algorithm identifier in the aggregated routing information is the same as the algorithm identifier in the original routing information carried in the packet, and a network segment indicated by a network segment identifier in the aggregated routing information includes a subnet indicated by the subnet identifier in the original routing information. It is assumed that the original routing information carried in the packet obtained by the second node includes the algorithm identifier 128 and the subnet identifier 4:1::/64. Then, the second node determines, in Table 5, that the aggregated routing information 1 matches the packet.

S703. The second node sends the packet to an area connection node based on the aggregated routing information.

Table 4 is used as an example. The second node stores the aggregated routing information 1 and the aggregated routing information 2. The aggregated routing information 1 is obtained by the second node from an area connection node 1, and the aggregated routing information 2 is obtained by the second node from an area connection node 2. Then, the aggregated routing information 1 may indicate the area connection node 1, or a next-hop node indicated in the aggregated routing information 1 is the area connection node 1. Therefore, if the second node obtains the aggregated routing information 1 through matching based on the packet, the second node may send the packet to the area connection node 1 indicated in the aggregated routing information 1. Similarly, the aggregated routing information 2 may indicate the area connection node 2, or a next-hop node indicated in the aggregated routing information 2 is the area connection node 2. Therefore, if the second node obtains the aggregated routing information 2 through matching based on the packet, the second node may send the packet to the area connection node 2 indicated in the aggregated routing information 2.

There are a plurality of manners in which the aggregated routing information 1 indicates the area connection node 1. For example, the aggregated routing information 1 carries indication information, and the indication information indicates a node identifier of the area connection node 1.

It is assumed that the second node receives the aggregated routing information 1 from the area connection node 1 on a path 1, and the second node sends the packet to the area connection node 1 on a path 2. The path 2 may be a reverse path of the path 1, or the path 2 is a path partially overlapping a reverse path of the path 1.

S704. The area connection node sends the packet to a target node in the first area.

As described above, in a possible case, the area connection node generates the aggregated routing information. Therefore, the area connection node stores the aggregated routing information, all original routing information aggregated in the aggregated routing information, and a node identifier (which may be a node number or another identifier used to identify a node) corresponding to each piece of original routing information, for example, as shown in Table 5:

TABLE 5

| Aggregated routing information | All aggregated original routing information (an original routing information set) | Corresponding node identifier |
| --- | --- | --- |
| Algorithm identifier 128, network segment identifier 4::/32 | Algorithm identifier 128, subnet identifier 4:1::/64 | Node 7 |
| | Algorithm identifier 128, subnet identifier 4:2::/64 | Node 6 |
| | Algorithm identifier 128, subnet identifier 4:3::/64 | Node 5 |
| | Algorithm identifier 128, subnet identifier 4:4::/64 | Node 4 |
| | Algorithm identifier 128, subnet identifier 4:5::/64 | Node 3 |

After receiving the packet, the area connection node determines that the original routing information (the algorithm identifier 128 and the subnet identifier 4:1::/64) carried in the packet corresponds to the node 7. Then, the area connection node sends the packet to the node 7 based on the original routing information.

As described above, in another possible case, FIG. 5 is used as an example, and the area connection node (namely, a node 3) receives aggregated routing information from the node 5 (for example, the aggregated routing information is generated by the node 5). Therefore, the area connection node stores the aggregated routing information, and does not store original routing information aggregated in the aggregated routing information. In this case, the area connection node may continue to send the packet to the node 5 based on the aggregated routing information. Because the node 5 stores the aggregated routing information, all original routing information aggregated in the aggregated routing information, and a node identifier (for example, Table 5) corresponding to each piece of original routing information, the node 5 determines, according to Table 5, that the original routing information (the algorithm identifier 128 and the subnet identifier 4:1::/64) in the packet corresponds to the node 7. Then, the node 5 sends the packet to the node 7.

It should be noted that in the process shown in FIG. 7, that the second node is a non-area connection node in a second area is used as an example. In actual application, the second node may be alternatively an area connection node. If FIG. 5 is used as an example, the second node may be a node 3 or a node 4. Because the area connection node can learn original routing information of all nodes in the first area, after obtaining the packet, the area connection node directly matches, based on a longest match principle, the packet with original routing information corresponding to a node in the first area, but does not match the packet with aggregated routing information, to directly determine, based on the original routing information, a node corresponding to the original routing information, and then send the packet to the node. For example, the original routing information carried in the packet includes the algorithm identifier 128 and the subnet identifier 4:1::/64, and the area connection node stores original routing information of each node in the first area, and can determine that the node corresponding to the original routing information carried in the packet is the node 7. Then, the packet is sent to the node 7.

In the foregoing specification, that the first area performs routing "flooding" to the second area is used as an example. A process in which the second area performs routing "flooding" to the first area is similar, and details are not described again.

In this embodiment, after the first area sends the aggregated routing information to the second area, if route flapping occurs in the first area, an impact caused on the aggregated routing information is relatively small. That the route flapping occurs in the first area includes that original routing information of a node in the first area changes. For example, a subnet identifier of a third node in the first area changes but an algorithm identifier remains unchanged. In this case, the aggregated routing information remains unchanged. In other words, the network segment identifier and the algorithm identifier in the aggregated routing information remain unchanged. FIG. 5 is still used as an example. It is assumed that the subnet identifier of the node 7 is changed from 4:1::/64 to 4:6::/64. In this case, aggregated routing information (4::/32) is not affected. In other words, the first area does not need to re-send the aggregated routing information to the second area.

Certainly, if the area connection node in the first area generates the aggregated routing information, when the subnet identifier of the third node in the first area changes, the area connection node needs to update a stored correspondence, where the correspondence is a correspondence among the aggregated routing information, all original routing information aggregated in the aggregated routing information, and a node corresponding to each piece of original routing information, for example, Table 5. FIG. 5 is still used as an example. It is assumed that the subnet identifier of the node 7 is changed from 4:1::/64 to 4:6::/64. Then, the subnet identifier corresponding to the node 7 in Table 5 is updated from 4:1::/64 to 4:6::/64.

Alternatively, when a new node is added in the first area, the first node may aggregate original routing information of the newly added node in the aggregated routing information. FIG. 5 is still used as an example. A fourth node, for example, a node 8, is added in the first area, and the fourth node is located in a same network segment as the node 3 to the node 7 and has a same flexible algorithm. In this case, original routing information of the node 8 may be aggregated in the aggregated routing information (4::/32). Specifically, the first node may add the original routing information of the node 8 to an original routing information set (including all original routing information aggregated in the aggregated routing information) corresponding to the aggregated routing information. For example, after the first node adds the original routing information of the node 8 to Table 5, Table 5 is updated to Table 6.

TABLE 6

| Aggregated routing information | All aggregated original routing information (an original routing information set) | Corresponding node identifier |
|---|---|---|
| Algorithm identifier 128, network segment identifier 4::/32 | Algorithm identifier 128, subnet identifier 4:1::/64 | Node 7 |
| | Algorithm identifier 128, subnet identifier 4:2::/64 | Node 6 |
| | Algorithm identifier 128, subnet identifier 4:3::/64 | Node 5 |
| | Algorithm identifier 128, subnet identifier 4:4::/64 | Node 4 |
| | Algorithm identifier 128, subnet identifier 4:5::/64 | Node 3 |
| | Algorithm identifier 128, subnet identifier 4:6::/64 | Node 8 |

Therefore, in this embodiment, after the first area sends the aggregated routing information to the second area, if route flapping occurs in the first area, the aggregated routing information is not affected, and there is no need to re-send the aggregated routing information to the second area, to reduce power consumption.

Figure 8:
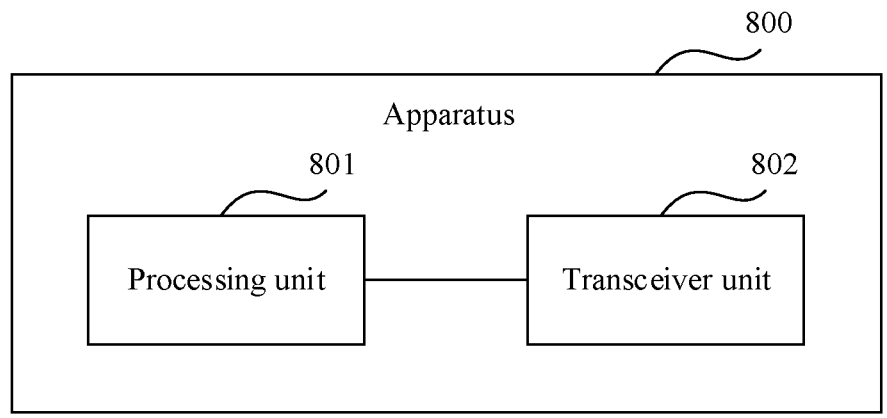
FIG. 8 is a schematic diagram of an apparatus according to an embodiment.

Same as the foregoing concept, as shown in FIG. 8, an embodiment further provides an apparatus 800. The apparatus 800 includes a transceiver unit 802 and a processing unit 801.

In an example, the apparatus 800 is configured to implement a function of the first node in the foregoing method. For example, the apparatus may be the first node, or may be an apparatus in the first node, for example, a chip system. The first node is a node in a network, the network includes a first area and a second area, and the node is included in the first area.

The processing unit 801 is configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer.

The transceiver unit 802 is configured to send the aggregated routing information to the second area, where the aggregated routing information is used to indicate a node in the second area to send a packet to the N nodes in the network segment based on the aggregated routing information.

Optionally, each of the plurality of pieces of original routing information includes the algorithm identifier and a subnet identifier, the subnet identifier is used to indicate a subnet in which a node corresponding to the original routing information is located, and the subnet is included in the network segment.

Optionally, the network segment identifier carried in the aggregated routing information is determined based on the subnet identifiers in the plurality of pieces of original routing information.

Optionally, when a subnet identifier in first original routing information in the plurality of pieces of original routing information changes, and an algorithm identifier included in the first original routing information remains unchanged, both the network segment identifier and the algorithm identifier in the aggregated routing information remain unchanged.

Optionally, the processing unit 801 is further configured to aggregate original routing information of a third node in the aggregated routing information, where the third node is a new node added in the network segment, and the third node has the flex-algo.

Optionally, the processing unit 801 is further configured to add original routing information of the third node to an original routing information set corresponding to the aggregated routing information, where the original routing information set includes all original routing information aggregated in the aggregated routing information.

Optionally, the node is an area connection node in the first area and the second area, or the node is another node in the first area other than an area connection node, where the area connection node is located in both the first area and the second area.

Optionally, when the node is the area connection node, the transceiver unit 802 is further configured to send the aggregated routing information to another node in the second area other than the area connection node.

Optionally, when the node is another node in the first area other than the area connection node, the transceiver unit 802 is further configured to send the aggregated routing information to the area connection node, so that the aggregated routing information is sent to another node in the second area other than the area connection node by using the area connection node.

In an example, the apparatus 800 is configured to implement a function of a second node in the foregoing method. For example, the apparatus may be the second node, or may be an apparatus in the second node, for example, a chip system. The second node is a node in a network, the network includes a first area and a second area, and the node is located in the second area.

The processing unit 801 is configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer.

The transceiver unit 802 is configured to send a packet to the N nodes in the network segment based on the aggregated routing information.

Optionally, the apparatus 800 is an area connection node in the first area and the second area, or the node is another node in the second area other than an area connection node, where the area connection node is located in both the first area and the second area.

Optionally, when the apparatus 800 is another node in the second area other than the area connection node, the processing unit 801 is further configured to obtain the aggregated routing information from the area connection node, where the area connection node stores the aggregated routing information and all original routing information aggregated in the aggregated routing information.

Optionally, the processing unit 801 is further configured to obtain a packet, where the packet matches the aggregated routing information, and a destination node of the packet is a node in the network segment.

The transceiver unit 802 is further configured to send the packet to the area connection node based on the aggregated routing information, so that the area connection node sends the packet to the destination node.

For specific execution processes of the processing unit 801 and the transceiver unit 802, refer to the record in the foregoing method embodiment. Module division in this embodiment is an example, is merely logical function division, and may be other division in actual implementation. In addition, function modules in the embodiments may be integrated into one processor, or each of the modules may exist alone physically, or two or more modules may be integrated into one module. The integrated module may be implemented in a form of hardware, or may be implemented in a form of a software functional module.

As another optional variant, the apparatus may be a chip system. In this embodiment, the chip system may include a chip, or may include a chip and another discrete component. For example, the apparatus includes a processor and an interface, and the interface may be an input/output interface. The processor completes a function of the processing unit 801, and the interface completes a function of the transceiver unit 802. The apparatus may further include a memory. The memory is configured to store a program that can be run on the processor. When executing the program, the processor implements the method in the foregoing embodiment.

Figure 9:
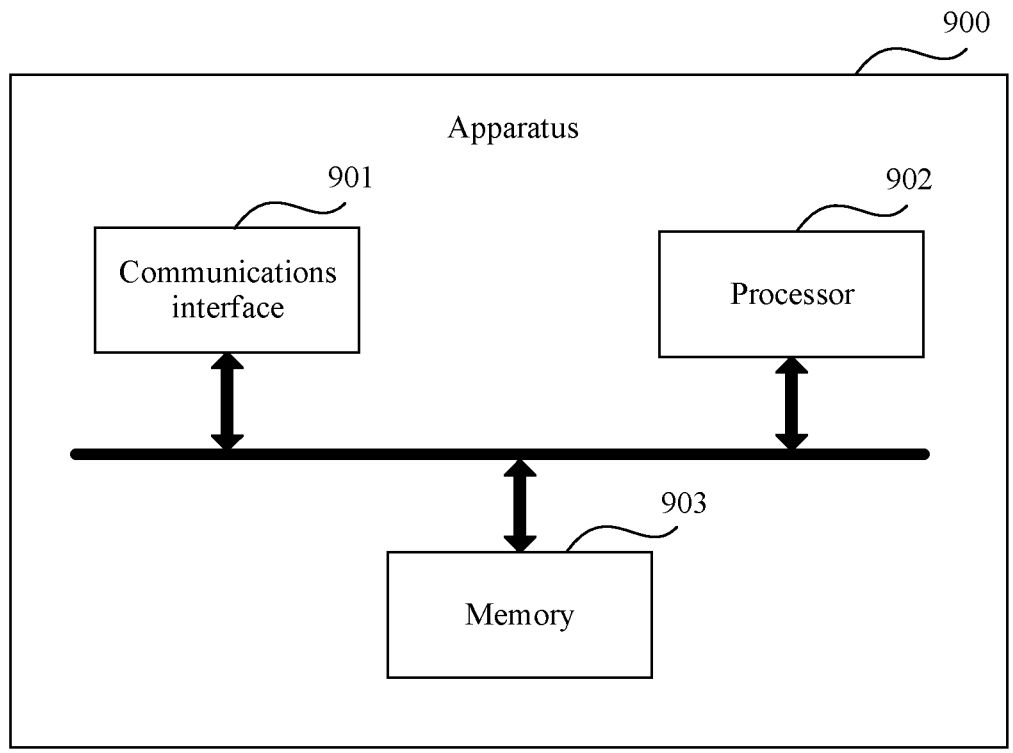
FIG. 9 is another schematic diagram of an apparatus according to an embodiment.

Same as the foregoing concept, as shown in FIG. 9, an embodiment further provides an apparatus 900. The apparatus 900 includes a communications interface 901, at least one processor 902, and at least one memory 903. The communications interface 901 is configured to communicate with another device by using a transmission medium, so that an apparatus in the apparatus 900 can communicate with another device. The memory 903 is configured to store a computer program. The processor 902 invokes the computer program stored in the memory 903, and receives and sends data by using the communications interface 901, to implement the method in the foregoing embodiment.

For example, when the apparatus 900 is the first node, the memory 903 is configured to store a computer program. The processor 902 invokes the computer program stored in the memory 903, to perform the method performed by the first node in the foregoing embodiment. When the apparatus 900 is the second node, the memory 903 is configured to store a computer program. The processor 902 invokes the computer program stored in the memory 903, to perform the method performed by the second node in the foregoing embodiment.

In this embodiment, the communications interface 901 may be a transceiver, a circuit, a bus, a module, or another type of communications interface. The processor 902 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments. The general purpose processor may be a microprocessor or any conventional processor or the like. The steps of the method disclosed with reference to the embodiments may be directly performed by a hardware processor, or may be performed by using a combination of hardware in the processor and a software module. The memory 903 may be a non-volatile memory such as a hard disk drive (HDD) or a solid-state drive (SSD), or may be a volatile memory such as a random-access memory (RAM). The memory is any other medium that can carry or store expected program code in a form of an instruction or a data structure and can be accessed by a computer, but is not limited thereto. The memory in this embodiment may be alternatively a circuit or any other apparatus that can implement a storage function. The memory 903 is coupled to the processor 902. Coupling in this embodiment is an interval coupling or a communication connection between apparatuses, units, or modules, may be in an electrical, mechanical, or another form, and is used for information exchange between the apparatuses, the units, or the modules. In another implementation, the memory 903 may be further located outside the apparatus 900. The processor 902 may cooperate with the memory 903. The processor 902 may execute program instructions stored in the memory 903. At least one of the at least one memory 903 may also be included in the processor 902. A connection medium between the communications interface 901, the processor 902, and the memory 903 is not limited in this embodiment. For example, in this embodiment, in FIG. 9, the memory 903, the processor 902, and the communications interface 901 may be connected by using a bus. The bus may be classified into an address bus, a data bus, a control bus, and the like.

It may be understood that the apparatus 800 in the embodiment shown in FIG. 8 may be implemented by the apparatus 900 shown in FIG. 9. Specifically, the processing unit 801 may be implemented by the processor 902, and the transceiver unit 802 may be implemented by the communications interface 901.

In an example, the apparatus 900 is configured to implement a function of the first node in the foregoing method. Specifically, the processor 902 is configured to obtain aggregated routing information, where the aggregated routing information is obtained by aggregating a plurality of pieces of original routing information, the plurality of pieces of original routing information correspond to N nodes in a network segment, the network segment is included in the first area, the N nodes have a same flexible algorithm flex-algo, the aggregated routing information carries an algorithm identifier used to indicate the flex-algo and a network segment identifier used to indicate the network segment, and N is a positive integer.

The communications interface 901 is configured to send the aggregated routing information to a second area, where the aggregated routing information is used to indicate a node in the second area to send a packet to the N nodes in the network segment based on the aggregated routing information.

In an example, the apparatus 900 is configured to implement a function of a second node in the foregoing method. Specifically, the processor 902 is configured to obtain aggregated routing information, where the aggregated routing information is obtained by aggregating a plurality of pieces of original routing information, the plurality of pieces of original routing information correspond to N nodes in a network segment, the network segment is included in the first area, the plurality of nodes in the network segment have a same flexible algorithm flex-algo, the aggregated routing information carries an algorithm identifier used to indicate the flex-algo and a network segment identifier used to indicate the network segment, and N is a positive integer.

The communications interface 901 is configured to send a packet to the N nodes in the network segment based on the aggregated routing information.

An embodiment further provides a routing system, including a first node configured to implement a function of the first node; and a second node configured to implement a function of the second node. The first node and the second node are nodes in a network, the network includes a first area and a second area, the first node is included in the first area, and the second node is included in the second area.

An embodiment further provides a computer readable storage medium. The computer readable storage medium stores computer instructions. When the computer instructions are run on a computer, the computer is enabled to perform the routing information sending method.

All or some of the foregoing methods may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, an SSD), or the like.

The foregoing embodiments are merely used to describe the technical solutions of this disclosure. The foregoing embodiments are merely intended to help understand the methods in the embodiments and shall not be construed as a limitation on the embodiments. Any variation or replacement readily figured out by a person skilled in the art shall fall within the protection scope of the embodiments.

What is claimed is:

1. A first node in a first area of a network and comprising:
a memory configured to store instructions; and
a processor coupled to the memory and configured to execute the instructions to cause the first node to:
aggregate pieces of original routing information that identify a same flexible algorithm (flex-algo) in order to obtain aggregated routing information, wherein the aggregated routing information identifies the flex-algo; and
send the aggregated routing information to a second node in a second area of the network.

2. The first node of claim 1, wherein each of the pieces comprises a subnet identifier, and wherein the subnet identifier indicates a subnet in which a node corresponding to the pieces is located.

3. The first node of claim 2, wherein the aggregated routing information comprises a network segment identifier, and wherein the network segment identifier is based on one or more subnet identifiers comprised in the pieces.

4. The first node of claim 3, wherein the network segment identifier remains unchanged when a first subnet identifier in a first piece of the original routing information changes.

5. The first node of claim 2, wherein the processor is further configured to execute the instructions to cause the first node to aggregate new pieces of the original routing information into the aggregated routing information.

6. The first node of claim 5, wherein the processor is further configured to execute the instructions to cause the first node to further aggregate the new pieces into an original routing information set corresponding to the aggregated routing information, and wherein the original routing information set comprises the pieces.

7. The first node of claim 1, wherein the first node is an area connection node located in both the first area and the second area, or the first node is not the area connection node and is located only in the first area.

8. The first node of claim 7, wherein when the first node is the area connection node, the processor is further configured to execute the instructions to cause the first node to send the aggregated routing information to the second node or to a third node in the second area.

9. The first node of claim 7, wherein when the first node is not the area connection node, the processor is further configured to execute the instructions to cause the first node to send the aggregated routing information to the area connection node for the area connection node to forward to another node in the second area.

10. The first node of claim 1, wherein the original routing information or the aggregated routing information is comprised in a link state packet (LSP).

11. The first node of claim 10, wherein the LSP is an Intermediate State to Intermediate State (IS-IS) LSP.

12. The first node of claim 10, wherein the original routing information or the aggregated routing information is further comprised in a subnet identifier type-length-value (TLV) in the LSP.

13. The first node of claim 1, wherein the first area and the second area implement Intermediate System to Intermediate System (IS-IS).

14. The first node of claim 1, wherein the aggregated routing information is for the second node to send a packet to the first area based on the aggregated routing information.

15. The first node of claim 1, wherein the aggregated routing information further comprises an algorithm identifier indicating the flex-algo.

16. The first node of claim 1, wherein the aggregated routing information further comprises a summarized Segment Routing over Internet Protocol version 6 (SRv6) locator, and wherein each of the pieces comprises an SRv6 locator.

17. A second node in a second area of a network and comprising:
a memory configured to store instructions; and
a processor coupled to the memory and configured to execute the instructions to cause the second node to:
receive aggregated routing information from a first node in a first area of the network, wherein the aggregated routing information is an aggregation of pieces of original routing information that identify a same flexible algorithm (flex-algo), and wherein the aggregated routing information identifies the flex-algo; and
send a packet to the first area based on the aggregated routing information.

18. The second node of claim 17, wherein the second node is an area connection node located in both the first area and the second area, or the second node is not the area connection node.

19. The second node of claim 18, wherein the second node is not the area connection node, and wherein the first node is the area connection node.

20. The second node of claim 19, wherein the processor is further configured to execute the instructions to cause the second node to:
obtain a packet matching the aggregated routing information; and
send the packet to the area connection node based on the aggregated routing information.

21. The second node of claim 17, wherein the original routing information or the aggregated routing information is comprised in a link state packet (LSP).

22. The second node of claim 21, wherein the LSP is an Intermediate State to Intermediate State (IS-IS) LSP.

23. The second node of claim 21, wherein the original routing information or the aggregated routing information is further comprised in a subnet identifier type-length-value (TLV) in the LSP.

24. The second node of claim 17, wherein the first area and the second area implement Intermediate System to Intermediate System (IS-IS).

25. A routing system comprising:
a first node in a first area of a network and configured to:
aggregate pieces of original routing information that identify a same flexible algorithm (flex-algo) in order to obtain aggregated routing information, wherein the aggregated routing information identifies the flex-algo; and
send the aggregated routing information; and
a second node in a second area of the network and configured to:
receive the aggregated routing information from the first node; and
send a packet to the first area based on the aggregated routing information.

26. The routing system of claim 25, wherein each of the pieces comprises a subnet identifier, and wherein the subnet identifier indicates a subnet in which a node corresponding to the pieces is located.

27. The routing system of claim 26, wherein the aggregated routing information comprises a network segment identifier, and wherein the network segment identifier is based on one or more subnet identifiers comprised in the pieces.

28. The routing system of claim 25, wherein the aggregated routing information further comprises an algorithm identifier indicating the flex-algo.

29. A method implemented by a first node in a first area of a network, the method comprising:
aggregating pieces of original routing information that identify a same flexible algorithm (flex-algo) in order to obtain aggregated routing information, wherein the aggregated routing information identifies the flex-algo; and
sending the aggregated routing information to a second node in a second area of the network.

30. The method of claim 29, wherein each of the pieces comprises a subnet identifier, and wherein the subnet identifier indicates a subnet in which a node corresponding to the pieces is located.

31. The method of claim 30, wherein the aggregated routing information comprises a network segment identifier, and wherein the network segment identifier is based on one or more subnet identifiers comprised in the pieces.

32. The method of claim 31, wherein the network segment identifier remains unchanged when a first subnet identifier in a first piece of the original routing information changes.

33. The method of claim 32, further comprising aggregating new pieces of original routing information into the aggregated routing information.

34. The method of claim 29, wherein the first node is an area connection node located in both the first area and the second area, or the first node is not the area connection node and is located only in the first area.

35. The method of claim 34, wherein when the first node is the area connection node, the method further comprises sending the aggregated routing information to the second node or to a third node in the second area.

36. The method of claim 34, wherein when the first node is not the area connection node, the method further comprises sending the aggregated routing information to the area connection node for the area connection node to forward to another node in the second area.

37. The method of claim 29, wherein the aggregated routing information further comprises an algorithm identifier indicating the flex-algo.

38. The method of claim 29, wherein the aggregated routing information further comprises a summarized Segment Routing over Internet Protocol version 6 (SRv6) locator, and wherein each of the pieces comprises an SRv6 locator.

* * * * *